(12) United States Patent
Karras et al.

(10) Patent No.: US 8,311,860 B2
(45) Date of Patent: Nov. 13, 2012

(54) INDUSTRY SCENARIO MAPPING TOOL

(75) Inventors: Markus Karras, Wiesbaden (DE); Nikolaus Mohr, Trier (DE); Karsten Kammer, Munich (DE)

(73) Assignee: Accenture Global Services Limited, Dublin (IE)

(*) Notice: Subject to any disclaimer, the term of this patent is extended or adjusted under 35 U.S.C. 154(b) by 1397 days.

(21) Appl. No.: 11/448,587

(22) Filed: Jun. 7, 2006

(65) Prior Publication Data

US 2007/0288297 A1    Dec. 13, 2007

(51) Int. Cl.
*G06Q 10/00* (2012.01)
(52) U.S. Cl. ...................................... 705/7.11; 705/7.36
(58) Field of Classification Search .................. 705/7.11, 705/7.36
See application file for complete search history.

(56) References Cited

U.S. PATENT DOCUMENTS

| | | | |
|---|---|---|---|
| 6,249,768 B1* | 6/2001 | Tulskie et al. ..................... | 705/7 |
| 2002/0013720 A1* | 1/2002 | Ozono et al. ...................... | 705/7 |
| 2004/0068431 A1* | 4/2004 | Smith et al. ...................... | 705/10 |
| 2005/0015261 A1* | 1/2005 | Reardon ........................... | 705/1 |
| 2007/0136271 A1* | 6/2007 | Masuyama et al. ................ | 707/5 |

OTHER PUBLICATIONS

G. Ringland "Introduction to Scenario", PlanningScenarios in Marketing. Edited by G. Ringland and L. Young. John Wiley & Sons, Ltd.*
Chermack, T, et. al "A Review of Scenario Planning Literature", Futures Research Quarterly Summer 2001.*
Hicks, M. "Industry Performance Gradient Indexes and Market Entrance: an empirical tool for market researchers" Lewis College of Business, Marshall University.*
Liron-Espana, "Market Power and Efficiency IMPACE3 of Concentration: Evidence From U.S. Manufacturing" Dissertation, University of Connecticutt, 2001.*
Morgan-Stanley, "The Role of Telecommunications Competition in Economic Change", presentation given at OECD Global Conference on Telecommunications Policy Dubai, Jan. 21-23, 2002.*
List, Dennis, PhD thesis "Chapter 5: Development of the initial scenario mapping process" downloaded from http://www.audiencedialogue.net/snm.html on or about Jun. 20, 2010.*
"Convergence is now: Accenture Mobile Handset Study", Management Summary available on the internet as of Apr. 12, 2006.*
Herbst, T., et al., "The Scenario Model—Looking Back from the Future—Telecommunications," date unknown, five pages (asserts to be taken from Frankfurter Allgemeine Zeitung, Feb. 10, 1998, pp. B1-B2).
Herbst, T., et al., "The Future of the German Telecommunications Market—A Survey of Top Executives of Regional, National and International Telecommunications Companies in Germany," generated by Andersen Consulting, 1998, pp. 1-36.
Author unknown, "Getting to the Future—Top Executive Survey—A Survey of Top Executives of Communications Companies," generated by Andersen Consulting, 1999, pp. 1-6.
Author unknown, "European Telecommunications 2002—The Search for Value," generated by Andersen Consulting, 1999, pp. 1-68.
Author unknown, "Middle East and Northern African Telecommunications 2005—Survey of 46 Senior Executive of Telecommunications Companies on Future Market Scenarios," generated by Andersen Consulting, 2000, pp. 1-39.

(Continued)

*Primary Examiner* — Mark A Fleischer

(57) ABSTRACT

A method of determining a future market scenario for an industry that includes obtaining subjective data from experts in an industry, combining the subjective data and determining from the combined subjective data which market scenario will apply to the industry in the future.

21 Claims, 36 Drawing Sheets

OTHER PUBLICATIONS

Author unknown, "Middle East and Northern African Telecommunications 2005: Ready for the Gold Rush," generated by Andersen Consulting, 2000, pp. 1-48.

Mohr, N., et al., "Convergence is Now: Accenture Mobile Handset Study," generated by Accenture, 2005, pp. 1-89.

Author unknown, "Paradise lost: The Future of the Mobile Handset Industry," source unknown, date unknown, pp. 63-100.

Rossi, D., et al., "Getting to the Future—A Scenario Framework on forces that shape the Communications Industry," generated by Andersen Consulting, date unknown, three pages.

* cited by examiner

Fig. 8A

[1a] Which market structure do you expect in five years time in your country's telecommunications industry?

Please begin by studying the two statements in each line. Then rate the statement with which you personally agree more. You can express the intensity of your agreement by specifying "1 = "Could be", 2 = "Likely" or 3 = "Very likely". You should only rate one of the statements in each line.

| Very likely | Likely | Could be | | | Could be | | | Likely | Very likely |
|---|---|---|---|---|---|---|---|---|---|
| 3 | 2 | 1 | | | 1 | 2 | 3 | | |
| Consolidated market with a few large companies 115 | | 111 3 | 2 | 1 | 1 | 2 | 3 | 112 Fragmented market with many small companies | |
| Many different broadband infrastructures exist (e.g. DSL, cable TV, wireless, satellite) | | 113 3 | 2 | 1 | 1 | 2 | 3 | 114 One broadband infrastructure predominates (e.g. DSL) | |
| Telecom companies gain a large revenue share from eCommerce and content services | | 115 3 | 2 | 1 | 1 | 2 | 3 | 116 Telecom companies remain limited to revenues from their core business (voice and data transportation) | |
| Inconsistent, proprietary, patent-protected tele-Com standards prevail | | 117 3 | 2 | 1 | 1 | 2 | 3 | 118 Global, interoperable telecom standards exist (e.g. UMTS, number | |
| Completely transparent tariffs and services for telecom users (clearly structured/comparable) | | 119 3 | 2 | 1 | 1 | 2 | 3 | 120 Market characterized by a confusing tariff and services jungle | |
| Cheap and easy access to transmission networks/technologies facilitates market entry (e.g. exchange-traded) | | 121 3 | 2 | 1 | 1 | 2 | 3 | 122 Limited and expensive access to transmission networks/technologies is a high market entry barrier | |
| Traditional media and retail companies remain dominant in the Internet economy | | 123 3 | 2 | 1 | 1 | 2 | 3 | 124 Internet companies have replaced traditional media and retail companies as the largest suppliers | |
| Most telcos have their own network and IT infrastructure | | 125 3 | 2 | 1 | 1 | 2 | 3 | 126 Most telcos lease or outsource their network and IT infrastructure | |
| Flat-rate tariff models prevail | | 127 3 | 2 | 1 | 1 | 2 | 3 | 128 Usage-based tariff models prevail | |
| Communications, content and computing will converge to one digital marketplace | | 129 3 | 2 | 1 | 1 | 2 | 3 | 130 Structural barriers between industries will persist | |
| Integrated voice/data communications and IP telephony have replaced traditional telecommunications services (PSTN) | | 131 3 | 2 | 1 | 1 | 2 | 3 | 132 There are different network infrastructures for voice and data communications. The Internet remains limited to certain services | |
| Traditional telecom carries remain dominant as the largest suppliers of telecom services | | 133 3 | 2 | 1 | 1 | 2 | 3 | 134 New entrants (Internet service providers, wholesalers, resellers) have replaced traditional telcos as the largest suppliers of telecom services | |

| 3 | | | 2 | | | 1 | | | | | | 1 | | | 2 | | | 3 | | |
|---|---|---|---|---|---|---|---|---|---|---|---|---|---|---|---|---|---|---|---|---|
| Very likely | | | Likely | | | Could be | | | | | | Could be | | | Likely | | | Very likely | | |

| Very likely | | | Could be | | | | Likely | Very likely |
|---|---|---|---|---|---|---|---|---|
| Broadband access will be affordable for the average household | 3 | 2 | 1 | 135 | 1 | 2 | 3 | 136 Broadband access will only be affordable for companies and high-income households |
| Vertically integrated carriers (network carriers cum service providers) dominate the prevailing business model | 3 | 2 | 1 | 137 | 1 | 2 | 3 | 138 Specialized suppliers occupying different stages of the value chain (e.g. infrastructure vendors, wholesalers, resellers) dominate the prevailing business model |
| Tariffs for telephone services in the local loop are only slightly reduced | 3 | 2 | 1 | 139 | 1 | 2 | 3 | 140 Free calls are becoming common for telephone services in the local loop |
| Telecom industry offers "growth for all" and high profit margins | 3 | 2 | 1 | 141 | 1 | 2 | 3 | 142 Telecom industry is characterized by predatory competition and small profit margins |
| Many confusing end-user devices for several communication services prevail | 3 | 2 | 1 | 143 | 1 | 2 | 3 | 144 Few multifunctional, converged end-user devices predominate |
| Telecom Industry acts as a catalyst for the entire economy, nurturing growth and improving the employment situations | 3 | 2 | 1 | 145 | 1 | 2 | 3 | 146 Development of telecom industry results above all in more rationalization and reduced employment |
| Regulator intervenes and cooperates with incumbent telcos to achieve overall social policy goals (e.g. employment, universal services) | 3 | 2 | 1 | 147 | 1 | 2 | 3 | 148 Regulator pursues strict deregulation, aiming at free competition (by granting many new licenses, securing open access to networks, etc.) |

1b. Which of the following market developments do you expect to be the primary cause of a consolidation process in the telecommunications industry?

Please choose the cause to which you attribute the greatest significance from the list below.

I expect the primary cause of a consolidation process to be...

- ...a change in regulatory policy     149
- ...the lacking profitability of suppliers     150
- ...the worldwide wave of mergers/globalization of markets     151
- ...the increasing convergence of the media/telecom/IT industries     152
- ...economics of scale/cost advantages thanks to network consolidation among competitors     153
- ...the demand for one-stop shopping     154

*Fig. 8A (cont'd)*

2a. Which demand behavior do you expect in five years time on your country's telecommunications market?

Note: Please begin by studying the two statements in each line. Then rate the statement with which you personally agree more. You can express the intensity of your agreement by specifying "1 = 'Could be', 2 = 'Likely' or 3 = 'Very likely'. You should only rate one of the statements in each line.

The majority of my country's residential customers...

*Fig. 8B*

| Very likely | Likely | Could be | | | Could be | Likely | Very likely |
|---|---|---|---|---|---|---|---|
| 3 | 2 | 1 | | | 1 | 2 | 3 |
| ...are willing to compare tariffs | | 155 3 | 2 | 1 | 1 2 3 156 | | ... are weary of tariff comparisons |
| ...have no access to online services at home | | 157 3 | 2 | 1 | 1 2 3 158 | | ...have access to online services at home |
| ...prefer to access online and broadcast services with a Personal Computer | | 159 3 | 2 | 1 | 1 2 3 160 | | ... prefer to access online and broadcast services with alternative equipment (e.g. TV/Set Top Box, mobile devices, screenphone) |
| ...are rather indifferent to service quality (e.g. responsiveness, consulting) | | 161 3 | 2 | 1 | 1 2 3 162 | | ... are willing to pay more for higher service quality |
| ...prefer individual services to a package | | 163 3 | 2 | 1 | 1 2 3 164 | | ... prefer attractive service packages (e.g. bundling of telephony, online access and content services |
| ...prefer virtual distribution and consulting channels (Call Center, Internet) | | 165 3 | 2 | 1 | 1 2 3 166 | | ... prefer direct distribution channels (specialized stores, trade chains) |
| ...are active, like to test new brands and use services and systems of different suppliers | | 167 3 | 2 | 1 | 1 2 3 168 | | ... are passive, show brand loyalty and prefer one-stop shopping |
| ...pursue offline activities in their leisure time (e.g. watching TV/DVD, window shopping) | | 169 3 | 2 | 1 | 1 2 3 170 | | ... pursue online activities in their leisure time (e.g. Internet surfing, chatting, games) |
| ...use the Internet as a personal utility (e.g. for information retrieval, shopping, telecommuting, distance learning) | | 171 3 | 2 | 1 | 1 2 3 172 | | ... are skeptical about or reject the use of the Internet as a personal utility (for example, because of insufficient data security or an alternative lifestyle) |
| ...use wireless services as substitute for wireline services | | 173 3 | 2 | 1 | 1 2 3 174 | | ... use wireless services complementary to wireline services |
| ...are willing to reduce other expenses in favor of new telecom and Internet services | | 175 3 | 2 | 1 | 1 2 3 176 | | ... are not willing to reduce other expenses in favor of new telecom and Internet services |

2b. Which of the following value-added services do you expect to be used by a large proportion (>10%) of households in your country in the year 2008?

| 1 | 2 | 3 | 4 | 5 | 6 |
|---|---|---|---|---|---|
| Definitely not | Unlikely | Possibly not | Could be | Likely | Very likely |

...... according to service sectors

- eCommerce (e.g. online shopping, online banking, online auctions)    177 [1][2][3][4][5][6]
- Telecommuting/distance learning    178 [1][2][3][4][5][6]
- Interactive entertainment (e.g. WebTV)    179 [1][2][3][4][5][6]
- Online communication (e.g. email)    180 [1][2][3][4][5][6]
- Online information retrieval    181 [1][2][3][4][5][6]

Which measures must be taken in order to promote the establishment of these services on the mass market?    182

...... according to infrastructure types

- Universal, cross-platform, integrated services (e.g. combined fixed-mobile phone)    183 [1][2][3][4][5][6]
- Copper cable network-based services (via DSL)    184 [1][2][3][4][5][6]
- Cable TV network-based services (via cable modems)    185 [1][2][3][4][5][6]
- Wireless network-based services (e.g. via UMTS, wireless ATM)    186 [1][2][3][4][5][6]
- Satellite services    187 [1][2][3][4][5][6]
- Powerline network-based services (via electricity wires)    188 [1][2][3][4][5][6]

Which measures must be taken to ensure that reliable broadband infrastructures become available to households in your country as quickly as possible?    189

2c. Which risk factor do you rate as the most significant for the development of demand?
Please specify only <u>one</u> risk factor.
The majority of my country's residential customers...

- ... have tested value-added and multimedia services, but have lost interest due to an unfavorable cost/benefit ratio    190
- ... are unaware of the benefits of the new services    191
- ... are generally not interested in value-added and multimedia services (due to their education, conservative attitudes, etc)    192
- ... churn after service/security problems occur (inadequate consulting, billing errors, services failures, etc.)    193
- ... lose interest due to constantly changing, complex products and services (e.g. unclear service attributes)    194
- ... are deterred by complexity (technology, incompatibility, etc.)    195

3a. Which telecommunications market scenario do you consider most likely to prevail in five years time in your country?

Please specify only one market scenario and state how likely you consider tit to be.

| 1 | 2 | 3 |
|---|---|---|
| Could be | Likely | Very Likely |

"Gold Rush"        196  [1] [2] [3]
"Shattered Dreams" 197  [1] [2] [3]
"Gilded Cage"      198  [1] [2] [3]
"Wars of Attrition" 199 [1] [2] [3]

Fragmented market with many small companies

Shattered Dreams

Hindered by strict competition legislation and a merciless price war, many service providers, most of them unprofitable, are struggling to survive in a fragmented market structure.

- Customers are churning, demanding only cheap, basic telephone services
- Virtual world rejected by mass market
- Frequent network failures, billing errors and cases of fraud standard, cheap technologies
- Standardize, cheap technologies

Gold Rush

The most optimistic liberalization forecasts have come true. Free competition is characterized by a booming demand for value-added and multimedia services, this demand being satisfied by a multitude of specialized suppliers.

- Innovative service packages
- TC, IT and media industries converge
- Highly fragmented value chain
- Data transported by wholesalers
- Retailers own customer relationship

Wars of Attrition

In this scenario of an undeveloped telecommunications market, a lack of demand has resulted in a supply oligopoly. Demand is characterized by residential customers who are skeptical of multimedia services. High-value telecom services stand no chance.

- Inconsistent regulation strategy
- Cost-based competition
- Excess capacity, merges and write-off of network investments
- No convergence of TC, and multimedia industries

Gilded Cage

The ideal scenario for a few global "supercarriers". In a rapidly developing multimedia world, protected by regulatory authorities, they dominate the market against newcomers.

- Vertically integrated value chain
- Demand not sensitive to price
- Regulator intervenes and cooperates with incumbents to achieve industrial policy goals
- Expensive, proprietary technologies and network infrastructures Steady demand for basic services Booming demand for value-added and multimedia services Consolidated market with a few large companies

*Fig. 8C (cont'd)*

3b Which measures do you consider need to be taken in order for the "Gold Rush" scenario to become a long-term reality in your country's telecommunications industry?

In the area of ...

Prices/tariffs
_____ 200

Infrastructure and end-user devices
_____ 201

Service offerings and bundling
_____ 202

Customer care and billing
_____ 203

Regulatory policy
_____ 204

Appendix

How many employees does your company operate with on a worldwide basis?

| | | |
|---|---|---|
| <250 | employees | 205 |
| 250-500 | employees | 206 |
| 500-1.000 | employees | 207 |
| 1.000-5.000 | employees | 208 |
| 5.000-10.000 | employees | 209 |
| 10.000 | employees | 210 |

Which type of supplier would you describe yourself as?

| | |
|---|---|
| National full-service provider | 211 |
| International full-service provider | 212 |
| City/regional carrier | 213 |
| Internet service provider | 214 |
| Reseller | 215 |
| Broadcaster/cable TV/media company | 216 |
| Equipment/system manufacturer | 217 |
| Other | 218 |

Fig. 9A

| Question 1a + 2a = Item-Batterie | variable | n = respondents | frequency | percent | mean |
|---|---|---|---|---|---|
| Telecom companies gain a large revenue share fr... | v115 | 46 | 26 | 56.5 | 1.8 |
| Telecom companies remain limited to revenues fr... | v116 | 46 | 20 | 43.5 | 1.9 |
| Completely transparent tariffs and services for tele... | v119 | 46 | 28 | 60.9 | 2.1 |
| Market characterized by a confusing tariff and ser... | v120 | 46 | 18 | 39.1 | 1.9 |
| Flat-rate tariff models prevail | v127 | 46 | 13 | 28.3 | 1.9 |
| Usage-based tariff models prevail | v128 | 46 | 33 | 71.7 | 2.3 |
| Communications, content and computing will conv... | v129 | 46 | 40 | 87.0 | 1.7 |
| Structural barriers between industries will persist | v130 | 46 | 6 | 13.0 | 1.7 |
| Integrated voice/data communications and IP telep... | v131 | 46 | 30 | 65.2 | 2.0 |
| There are different network infrastructures for voic... | v132 | 46 | 16 | 34.8 | 1.6 |
| Broadband access will be affordable for the averag... | v135 | 46 | 26 | 56.5 | 2.4 |
| Broadband access will only be affordable for comp... | v136 | 46 | 20 | 43.5 | 2.2 |
| Tariffs for telephone services in the local loop are... | v139 | 46 | 24 | 52.2 | 1.8 |
| Free calls are becoming common for telephone se... | v140 | 46 | 22 | 47.8 | 2.2 |
| Many confusing end-user devices for several com... | v143 | 46 | 25 | 54.4 | 1.8 |
| Few multifunctional, converged end-user devices... | v144 | 46 | 21 | 45.7 | 1.9 |

SUPPLY

Fig. 9B

| Question 1a + 2a = Item-Batterie | variable | n = respondents | frequency | percent | mean |
|---|---|---|---|---|---|
| ... are willing to compare tariffs | v155 | 46 | 40 | 87.0 | 2.3 |
| ... are weary of time-consuming tariff comparisons | v156 | 46 | 6 | 13.0 | 2.2 |
| ... have no access to online services at home | v157 | 46 | 8 | 17.4 | 1.9 |
| ... have access to online services at home | v158 | 46 | 38 | 82.6 | 2.3 |
| ...prefer to access online and broadcast services with a F | v159 | 46 | 14 | 30.4 | 2.1 |
| ...prefer to access online and broadcast services with alt | v160 | 46 | 32 | 69.6 | 2.0 |
| ... are rather ignorant of service quality (e.g. responsiven | v161 | 46 | 14 | 30.4 | 1.8 |
| ... are willing to pay more for higher service quality | v162 | 46 | 32 | 69.6 | 1.8 |
| ... prefer individual services to a package | v163 | 46 | 11 | 23.9 | 1.8 |
| ... prefer attractive service packages (e.g. bundling of tel | v164 | 46 | 35 | 76.1 | 2.0 |
| ... prefer virtual distribution and consulting channels (Call | v165 | 46 | 20 | 43.5 | 2.0 |
| ... prefer direct distribution channels (specialized stores, | v166 | 46 | 26 | 56.5 | 1.9 |
| ... are active, like to test new brands and use services an | v167 | 46 | 30 | 65.2 | 1.9 |
| ... are passive, show brand-loyalty and prefer one-stop sh | v168 | 46 | 16 | 34.8 | 1.6 |
| ... pursue offline activities in their leisure time (e.g. watchi | v169 | 46 | 24 | 52.2 | 2.0 |
| ... pursue online activities in their leisure time (e.g. Interne | v170 | 46 | 22 | 47.8 | 1.7 |
| ... use the Internet as a personal utility (e.g. for informatio | v171 | 46 | 39 | 84.8 | 2.2 |
| ... are skeptical about or reject the use of the Internet as a | v172 | 46 | 7 | 15.2 | 1.1 |
| ...use wireless services as substitute for wireline services | v173 | 46 | 26 | 54.5 | 2.1 |
| ...use wireless services complementary to wireline servic | v174 | 46 | 20 | 43.5 | 2.0 |
| ... are willing to reduce other expenses in favor of new te | v175 | 46 | 28 | 60.9 | 1.2 |
| ... are not willing to reduce other expenses in favor of ne | v176 | 46 | 18 | 39.1 | 1.7 |

DEMAND

Fig. 9C

Question 2b (part 1)
Which of the following value-added services do you expect to be used by a large proportion (>10%) of households in your country in the year 2008? ... according to service sectors

| variable | n = respondents | no frequency | no percent | yes frequency | yes percent | mean |
|---|---|---|---|---|---|---|
| | | | | | | |
| v177 | 46 | 10 | 21.7 | 36 | 78.3 | 4.3 |
| v178 | 46 | 16 | 34.8 | 30 | 65.2 | 3.9 |
| v179 | 46 | 15 | 32.6 | 31 | 67.4 | 4.0 |
| v180 | 46 | 3 | 6.5 | 43 | 93.5 | 5.3 |
| v181 | 46 | 5 | 10.9 | 41 | 89.1 | 5.1 | eCommerce (e.g. online shopping, online banking)
Telecommuting/distance learning
Interactive entertainment (e.g. WebTV)
Online communication (e.g. email)
Online information retrieval

Question 2c
Which risk factor do you rate as the most significant for the development of demand?

| variable | n = respondents | frequency | percent |
|---|---|---|---|
| v190 | 46 | 11 | 23.9 |
| v191 | 46 | 14 | 30.4 |
| v192 | 46 | 10 | 21.7 |
| v193 | 46 | 3 | 6.5 |
| v194 | 46 | 3 | 6.5 |
| v195 | 46 | 5 | 10.9 |

... have tested value-added and multimedia services, but
... are unaware of the benefits of the new services
... are generally not interested in value-added and multim
... churn after service/security problems occur (inadequa
... lose interest due to constantly changing, complex proc
... are deterred by complexity (technology, incompatibility

DEMAND

Fig. 9D

| Question 1a + 2a = Item-Batterie | variable | n = respondents | frequency | percent. | mean |
|---|---|---|---|---|---|
| Consolidated market with a few large co[m] | v111 | 46 | 37 | 80.4 | 2.3 |
| Fragmented market with many small con[...] | v112 | 46 | 9 | 19.6 | 2.1 |
| Traditional media and retail companies [...] | v123 | 46 | 20 | 43.5 | 1.5 |
| Internet companies have replaced traditi[...] | v124 | 46 | 26 | 56.5 | 1.6 |
| Most telcos have their own network and | v125 | 45 | 32 | 71.1 | 2.2 |
| Most telcos lease or outsource their net[...] | v126 | 45 | 13 | 28.9 | 1.8 |
| Traditional telecom carriers remain dom[...] | v133 | 46 | 36 | 78.3 | 1.9 |
| New entrants (Internet service providers,[...] | v134 | 46 | 10 | 21.7 | 1.9 |
| Vertically integrated carriers (network ca[...] | v137 | 46 | 31 | 67.4 | 1.7 |
| Specialized suppliers occupying differen[...] | v138 | 46 | 15 | 32.6 | 1.7 |
| Telecom industry offers "growth for all", a[...] | v141 | 46 | 28 | 60.9 | 1.9 |
| Telecom Industry is characterized by pre[...] | v142 | 46 | 18 | 39.1 | 2.2 |

Question 1b
Which of the following market developments do you expect to be the primary cause of consolidation process in the telecommunications industry?

| | variable | n = respondents | frequency | percent |
|---|---|---|---|---|
| ... a change in regulatory policy | 149 | 46 | 13 | 28.3 |
| ... the lacking profitability of suppliers | 150 | 46 | 2 | 4.3 |
| ... the worldwide wave of mergers/globa[l] | 151 | 46 | 6 | 13.0 |
| ... the increasing convergence of the m[...] | 152 | 46 | 19 | 41.3 |
| ... economies of scale/cost advantages | 153 | 46 | 4 | 8.7 |
| ... the demand for one-stop shopping | 154 | 46 | 2 | 4.3 |

COMPETITION

Fig. 9E

Question 1a + 2a = Item-Batterie

| | variable | n = respondents | frequency | percent | mean |
|---|---|---|---|---|---|
| Many different broadband infrastructures exist (e.g | v113 | 46 | 32 | 69.6 | 2.2 |
| One broadband infrastructure predominates (e.g. C | v114 | 46 | 14 | 30.4 | 2.1 |
| Inconsistent, proprietary, patent-protected telecom | v117 | 46 | 13 | 28.3 | 1.5 |
| Global, interoperable telecom standards exist (e.g. | v118 | 46 | 33 | 71.7 | 2.0 |
| Cheap and easy access to transmission networks/t | v121 | 46 | 36 | 78.3 | 2.1 |
| Limited and expensive access to transmission netw | v122 | 46 | 10 | 21.7 | 1.4 |

Question 2b (part 2)

Which of the following value-added services do you expect to be used by a large proportion (>10%) of households in your country in the year 2008? ... according to infrastructure types

| | variable | n = respondents | no frequency | no percent | yes frequency | yes percent | mean |
|---|---|---|---|---|---|---|---|
| Universal, cross-platform, integrated services (e.g. | v183 | 46 | 12 | 26.1 | 34 | 73.9 | 4.1 |
| Copper cable network-based services (via DSL) | v184 | 46 | 10 | 21.7 | 36 | 78.3 | 4.3 |
| Cable TV network-based services (via cable moder | v185 | 46 | 19 | 41.3 | 27 | 58.7 | 3.6 |
| Wireless network-based services (e.g. via UMTS, \ | v186 | 46 | 9 | 19.6 | 37 | 80.4 | 4.4 |
| Satellite services | v187 | 46 | 18 | 39.1 | 28 | 60.9 | 4.0 |
| Powerline network-based services (via electricity w | v188 | 45 | 38 | 84.4 | 7 | 15.6 | 2.4 |

INFRASTRUCTURE

Fig. 9F

Question 1a + 2a = Item-Batterie

| | | n = | | | |
|---|---|---|---|---|---|
| | variable | respondents | frequency | percent | mean |
| Telecom Industry acts as a catalyst for the entire e | v145 | 46 | 37 | 80.4 | 2.2 |
| Development of telecom Industry results above all | v146 | 46 | 9 | 19.6 | 1.7 |
| Regulator intervenes and cooperates with Incumbx | v147 | 46 | 25 | 54.3 | 1.7 |
| Regulator pursues strict deregulation, aiming at fre | v148 | 46 | 21 | 45.7 | 1.8 |

REGULATORY POLICY

Fig. 9G

| Question 3a | variable | n = respondents | frequency | percent | mean |
|---|---|---|---|---|---|
| Gold Rush | v196 | 46 | 13 | 28.3 | 2.2 |
| Shattered Dreams | v197 | 46 | 4 | 8.7 | 1.8 |
| Gilded Cage | v198 | 46 | 19 | 41.3 | 2.2 |
| Wars of Attrition | v199 | 46 | 10 | 21.7 | 2.3 |
| No answer | | | | | |

SCENARIO

Fig. 9H

How many employees does your company operate with on a worldwide basis?

| variable | n = respondents | frequency | percent |
|---|---|---|---|
| v205 | 46 | 12 | 26.1 |
| v206 | 46 | 8 | 17.4 |
| v207 | 46 | 1 | 2.2 |
| v208 | 46 | 18 | 39.2 |
| v209 | 46 | 4 | 8.7 |
| v210 | 46 | 3 | 6.5 |

< 250
250 - 500
500 - 1,000
1,000 - 5,000
5,000 - 10,000
> 10,000

Which type of supplier would you describe yourself as?

| variable | n = respondents | frequency | percent |
|---|---|---|---|
| v211 | 46 | 19 | 41.3 |
| v212 | 46 | 8 | 17.4 |
| v213 | 46 | 0 | 0.0 |
| v214 | 46 | 4 | 8.7 |
| v215 | 46 | 0 | 0.0 |
| v216 | 46 | 1 | 2.2 |
| v217 | 46 | 0 | 0.0 |
| v218 | 46 | 14 | 30.4 |

National full-service provider
International full-service provider
City / regional carrier
Internet service provider
Reseller
Broadcaster / cable TV / media cor
Equipment / system manufacturer
Other

COMPANY ATTRIBUTES

| | | | | | | | | | |
|---|---|---|---|---|---|---|---|---|---|
| | W | V | B | M | W | V | B | M | |
| Few large vendors dominate the market | X | | | | X | | | | A multitude of small vendors occupy different market segments |
| A multitude of alternative broadband infrastructures have established (e.g. Coppercable, fiber-optic cable, Stromkabel, tv cable, cellular radio, satellite) | | X | | | | X | | | A multitude of alternative broadband infrastructures have established (e.g. Coppercable, fiber-optic cable, Stromkabel, tv cable, cellular radio, satellite) |
| Telecommunication Companies make a large portion of their sales volume by eCommerce and content-related services | | | X | | | | X | | Telecommunication Companies are limited to sales volumes of their core business (voice and data transport) |
| Heterogenous, proprietary and patented TK-Standards dominate | X | | | | | X | | | Worldwide acknowledge, interoperable TK-standards have prevailed (e.g. UMTS, number portability) |
| Full transparency of tariff and performance transparency in use of telecommunication services is ensured (Comprehensibility, Comparability) | X | | | | | X | | | Market is a complex jungle of tariffs and services |
| Cheap and easy access to communication networks and technologies stimulates market entries (e.g. tradable at stock markets) | | X | | | | X | | | Limited and expensive access to communication networks and technologies presents a sizeable obstacle for market entries |
| Traditional media and trade companies dominate the Internet economy | X | | | | | X | | | Internet-based companies are taking over the role of traditional media and trade companies as the largest vendors |
| The majority of telecommunication companies runs its own net and IT infrastructure | X | | | | | X | | | The majority of telecommunication companies are leasing or outsourcing net and IT infrastructures |
| The dominant tariff structure model is based on flat fees | | | X | | | | X | | The dominant tariff structure model is based on usage-dependent |
| Continuing convergence of sectors leads to a uniform digital market place for products and services | | | X | | | | X | | Structural barriers between sectors are being upheld |
| Integrated voice and data communication and VoIP have superseded conventional telecommunication (PTSN) | | | X | | | | X | | Voice and data communication happen on differet net infrastructures. The internet is restricted to certain services |
| The traditional telecommunication companies defend their market position as largest providers of telecommunication services | X | | | | | X | | | New Entrants (Internet-Service-Providers, wholesale merchants and retailers) take over the role of traditional telecommunication companies as largest providers of telecommunication services |

1a. What market structure do you expect for the telecommunication sector of your country five years from now?

W = Few providers; V = Many providers; B = basic services; M = multimedia services.

*Fig. 10A*

| | | | | | | |
|---|---|---|---|---|---|---|
| Broadband net access will be affordable for The average household | | | X | | X | | Broadband net access will be affordable only for companies and high-profile households |
| Vertically integrated providers (infrastructure owner and service provider) coin the dominating business model | X | | | | X | | Providers, specialized on specific added value activities (e.g. infrastructure providers, pure service providers) coin the dominating business model |
| Tariffs for local calls in telephone services are decreasing only slightly | X | | | | X | | Free local calls are prevailing in telephone services |
| "Growth for Everyone" and high profitability characterize the telecommunications sector | | | X | | X | | Cut-throat competition and narrow profit margins characterize the telecommunications market |
| A clear range of different end-devices for different telecommunication services prevails | | X | | | | X | Few multifunctional and convergent end-devices are dominationg |
| Development of the telecommunications sector acts as a promoter for growth and employment | | | X | | X | | Development of the telecommunications sector in total leads to rationalization/ streamlining effects and hence leads to reduced employment |
| The national regulatory authority intervenes and cooperates with largetelecommuni- cation providers to attain goals for the society as a whole (e.g. employment, universal services) | X | | | | X | | The national regulatory authority pursues a strict course of deregulation, and trusts in open competition (active licensing, open net access, etc.) |

*Fig. 10A (cont'd)*

1b. What market development potentially leading to a process on concentration in the telecommunications sector do you consider as being most important?

*Please choose from the list the causation you consider most important.*

*I consider a concentration process for being most possible, based on...*

| | |
|---|---|
| • ... a change of regulatory politics | W |
| • ...lacking profitability of providers | B |
| • ...worldwide phases of fusion/market globalization | W |
| • ...continuing convergence of media/telecommunications/information technologies sectors | M |
| • ...size and cost advantages from net integration by competitors | W |
| • ...demand for one-stop service offers | M |

2a. What demand behavior do you expect for the telecommunications market of your country five years from now?

| | W | V | B | M | W | V | B | M | |
|---|---|---|---|---|---|---|---|---|---|
| ...shows high willingness for tariff comparisons | | X | | | X | | | | ...has become tired of tariff comparisons |
| ...does not have online access in the household | | | X | | | | | X | ...has online access in the household |
| ...prefers using a personal computer to access online services and television content | N,A | N,A | N,A | N,A | N,A | N,A | N,A | N,A | ...prefers using alternative end devices (e.g. TV/Internet-Set-Top-box, mobile end devices, VoIP Telefone) to access online services and television content |
| ...is undemanding in respect to quality of service (e.g. service times, helpdesk/advice, etc.) | | | X | | | | | X | ...rewards improved quality of service by willingness to pay higher taxes |
| ...prefers individual services to bundled services | | | X | | | | | X | ...rewards bundled services by willingness to pay higher tfees |
| ...prefers indirect retail and service channels (Call Center, Internet) | | | | X | | | X | | ...prefers direct retail channels (specialized trade, trade chains) |
| ...is proactive, shows high willingness to change, and uses several providers | X | | | | X | | | | ...is passive, brand-loyal, and prefers one-stop solutions |
| ...makes use of offline services for leisure (e.g. TV/DVD, window shopping in the pedestrian area) | | | X | | | | | X | ...makes use of online services for leisure (e.g. Internet-Chatting, Online-Gaming) |
| ...considers the Internet a personal basic commodity (e.g. Information retrieval, shopping, tele-working, tele-learning) | | | | X | | | | X | ...is skeptical or declining regarding the use of the internet as a basic commodity (e.g. because of insufficient security of data, alternative lifestyles |
| ...makes use of mobile telecommunication services as a replacement for landline services | N,A | N,A | N,A | N,A | N,A | N,A | N,A | N,A | ...makes use of mobile telecommunication services as a complement to landline services |
| ...is prepared to reduce other spendings in favor of the use of innovative telecommunication services | | | | X | | | | X | ...is not prepared to reduce spendings in favor of the use of innovative telecommunication services |

*Fig. 10B*

| 2b. Which of the following added value services will find a high rate of employment (>10%) by households in your country in 2008?.......................... |||||||||
|---|---|---|---|---|---|---|---|
| ... by service sectors |||||||||
| • eCommerce (e.g. online-shopping, online-banking | 177 | B3 | B2 | B1 | M1 | M2 | M3 |
| • tele-working/tele-learning | 178 | B3 | B2 | B1 | M1 | M2 | M3 |
| • interactive entertainment (e.g. WebTV | 179 | B3 | B2 | B1 | M1 | M2 | M3 |
| • online communication (e.g. email) | 177 | B3 | B2 | B1 | M1 | M2 | M3 |
| • online information research | 177 | B3 | B2 | B1 | M1 | M2 | M3 |
| What means have to be taken to help these offered services to a breakthrough into mass market? _____ 182 |||||||||
| ... by infrastructure types |||||||||
| • universal, platform-independent and integrated services (e.g. joined mobile and land-line telephone) | 183 | B3 | B2 | B1 | M1 | M2 | M3 |
| • copper cable based services (e.g. via ADSL) | 184 | B3 | B2 | B1 | M1 | M2 | M3 |
| • cable network based services (e.g. two-way communication) | 185 | B3 | B2 | B1 | M1 | M2 | M3 |
| • mobile radio based services (e.g. via wireless ATM) | 186 | B3 | B2 | B1 | M1 | M2 | M3 |
| • satellite basierte services | 187 | B3 | B2 | B1 | M1 | M2 | M3 |
| • powerline based services | 188 | B3 | B2 | B1 | M1 | M2 | M3 |
| What means have to be taken for households in your country to have access to working broadband infra-structures as fast as possible? _____ 189 |||||||||

| 2c. What risk component do you consider the most important one in regards to the development of demand? Please choose one risk component. ||
|---|---|
| A majority of German private customers ... ||
| • ... has tested added-value and multimedia services, but loses interest due to an unfavourable cost-value ratio | W |
| • ... is not aware of the value of the new services | n a |
| • ... is generally disinterested in added-value and multimedia services (caused by education, conservative behavior, etc.) | B |
| • ... turns away after problems with service and security (insufficient consulting/advising, incorrect billing, failure of service, etc...) | V |
| • ... loses interest due to a complex and continuously changing diversity of offerings (e.g. ambiguous service features) | V |
| • ... is scared off by complexity of use (technical issues, incompatibilities, etc.) | B |

3a. What telecommunications market scenario is, in your opinion, going to be dominating four years from now? Please only choose one market scenario and provide a probability for it to set in.

Please pick one scenario.

| 1 | 2 | 3 |
|---|---|---|
| Slightly favourable yes | Quite probably | Most probably |

| | | | 1 | 2 | 3 |
|---|---|---|---|---|---|
| "Gold Rush" | | | V, M,1 | V, M,2 | V, M,3 |
| "Paradise Lost" | | | V, B,1 | V, B2 | V, B,3 |
| "Golden Cage" | | | W, M,1 | W, M,2 | W, M,3 |
| "Head Hunt" | | | W, B,1 | W, B,2 | W, B,3 |

Fig. 10C

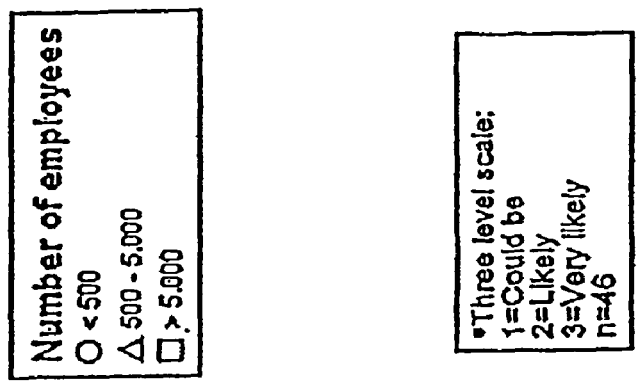
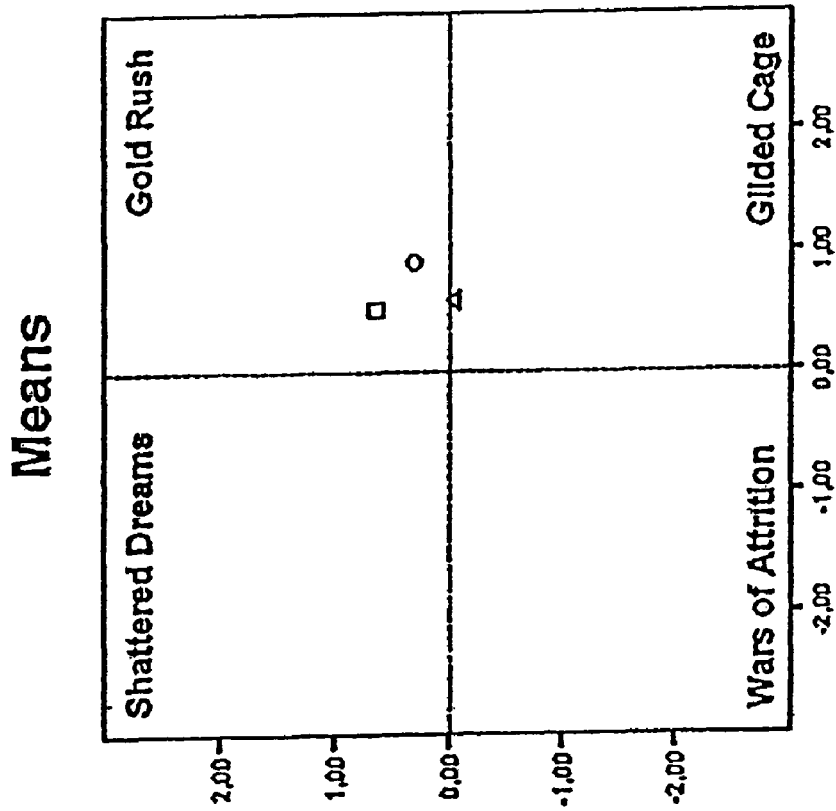
Fig. 11H

INDUSTRY SCENARIO MAPPING TOOL

BACKGROUND OF THE INVENTION

1. Field of the Invention

The present invention relates to devices and processes that evaluate industry scenarios in the past and/or generate industry scenarios for the future.

2. Related Art

History often presents lessons on how to avoid certain predicaments as well as on how to succeed. This is true in personal matters, governmental matters and in specific industries. In the case of a specific industry, it is often a problem for an observer to grasp what factors in an industry, such as the mobile handset industry, are important enough to affect how the industry operates at different points in time.

Even when important factors are identified which drive an industry, it is often difficult to forecast how an industry will develop in the future, say in the next 5 to 10 years. Obviously, a company having the ability to predict future trends in its own industry provides that company many advantages on how to prepare for the future in a way that is most advantageous to the company. In the past, market research has described industry structure by data tables or by two dimensional, two indicators based graphs. Scenario analyses are also a common tool to make predictions about future industry trends and developments. Unfortunately, such market research and scenario analyses were not a reliable way to predict future trends in a particular industry.

SUMMARY OF THE INVENTION

One aspect of the present invention regards an industry scenario mapping tool that includes a processor and a visual display electrically connected to the processor, wherein the processor prepares an advice screen to be shown on the visual display. The advice screen displays a 2×2 matrix representing four scenario regions and containing a graph plotting two market factors that can be used to show a market scenario in which an industry fits during a particular time period.

A second aspect of the present invention regards a method of determining a future market scenario for an industry that includes obtaining subjective data from experts in an industry, combining the subjective data and determining from the combined subjective data which market scenario will apply to the industry in the future.

A third aspect of the present invention regards an industry scenario mapping tool that includes a processor and a memory in communication with the processor. The memory has a structure so as to store and implement a program in conjunction with the processor so as to: 1) combine subjective data stored in the memory that has been obtained from experts in an industry and 2) determine from the combined subjective data which market scenario will apply to the industry in the future.

A fourth aspect of the present invention regards a method of determining a market scenario for an industry by obtaining at least two types of market data regarding an industry and determining from the at least two types of market data a market scenario from four scenarios: "Paradise Lost," "Gold Rush," "Wars of Attrition" and "Gilded Cage".

BRIEF DESCRIPTION OF THE DRAWINGS

FIGS. 8A-C show a sample of a questionnaire that is used to pose questions to interviewees;

FIGS. 9A-H shows a summary of answers given to the questions of the questionnaire of FIGS. 8A-C;

FIGS. 10A-C show a sample of an analysis guide for the questionnaire questions of the questionnaire of FIGS. 8A-C that will be posed to interviewees to generate future market data in accordance with the present invention;

FIGS. 11A-H show various 2×2 matrices that show various expectations for participants answering the questionnaire of FIGS. 8A-C;

DETAILED DESCRIPTION OF THE DRAWINGS AND THE PRESENTLY PREFERRED EMBODIMENTS

Figure 1:
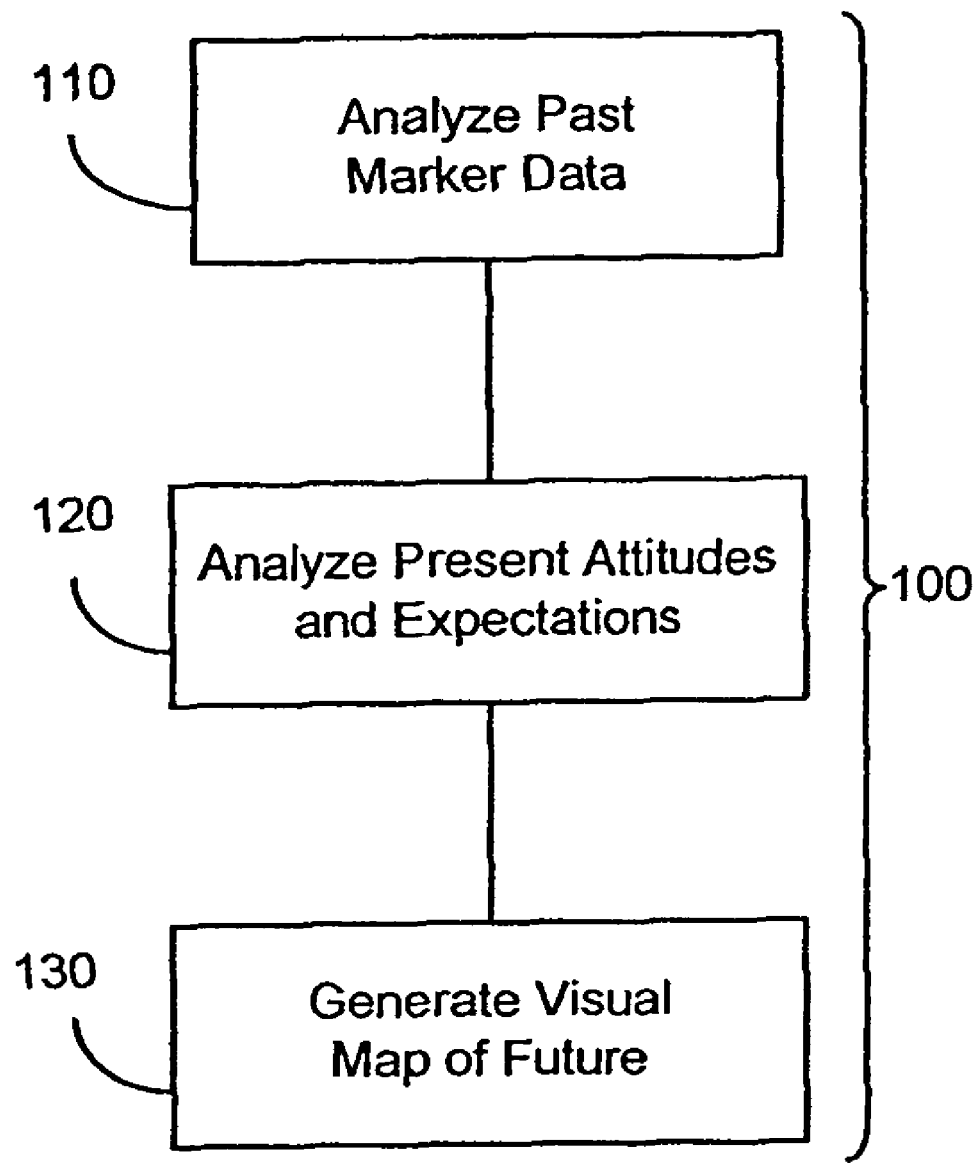
FIG. 1 schematically shows an embodiment of a scenario mapping process in accordance with the present invention.

As schematically shown in FIG. 1, an embodiment of an industry scenario mapping process 100 in accordance with the present invention generally entails three process: 1) analyze past market data from an industry of interest 110, 2) analyze present attitudes and expectations in the industry of interest 120 and 3) combine the data garnered from items 1) and 2) mentioned above so as to generate a visual map of how the industry of interest will look in the future 130.

Regarding the first process 110, raw market data from the industry is analyzed to determine if there is a historical relationship between one market parameter and one or more other market parameters. Examples of market parameters that can be analyzed are supply, sales, industry concentration, demand behavior and government/industry regulation. Determining what particular parameters to study first depends on understanding the characteristics of the industry. For example, the parameters to be analyzed for a relatively young industry, such as the mobile handset industry, may be totally different than the parameters to be analyzed for a well established industry, such as the automobile industry. The analysis of the data preferably is over a range of years, such as eight years, so that statistically significant data can be analyzed.

In the case of the mobile handset industry, it is a relatively young industry. The question at hand is whether it is gravitating to becoming a mature industry and if so when will it achieve that milestone. To approximate the maturity of a young industry, such as the mobile handset industry, growth is a key indicator. If growth can be observed, the industry is likely to be in a developing stage. A slowdown of growth or even stagnation suggests a maturing industry. When an industry shrinks considerably for several periods, it is probably already beyond its maturity phase. Therefore, growth is an indispensable indicator to analyze the mobile handset industry.

One measure of growth in the mobile handset industry is the amount of mobile handsets shipped from the factory each year, wherein a mobile handset is defined as any portable device that is equipped with a SIM card, such as mobile phones, data cards used for laptops or SIM-equipped wireless PDAs.

Figure 2:
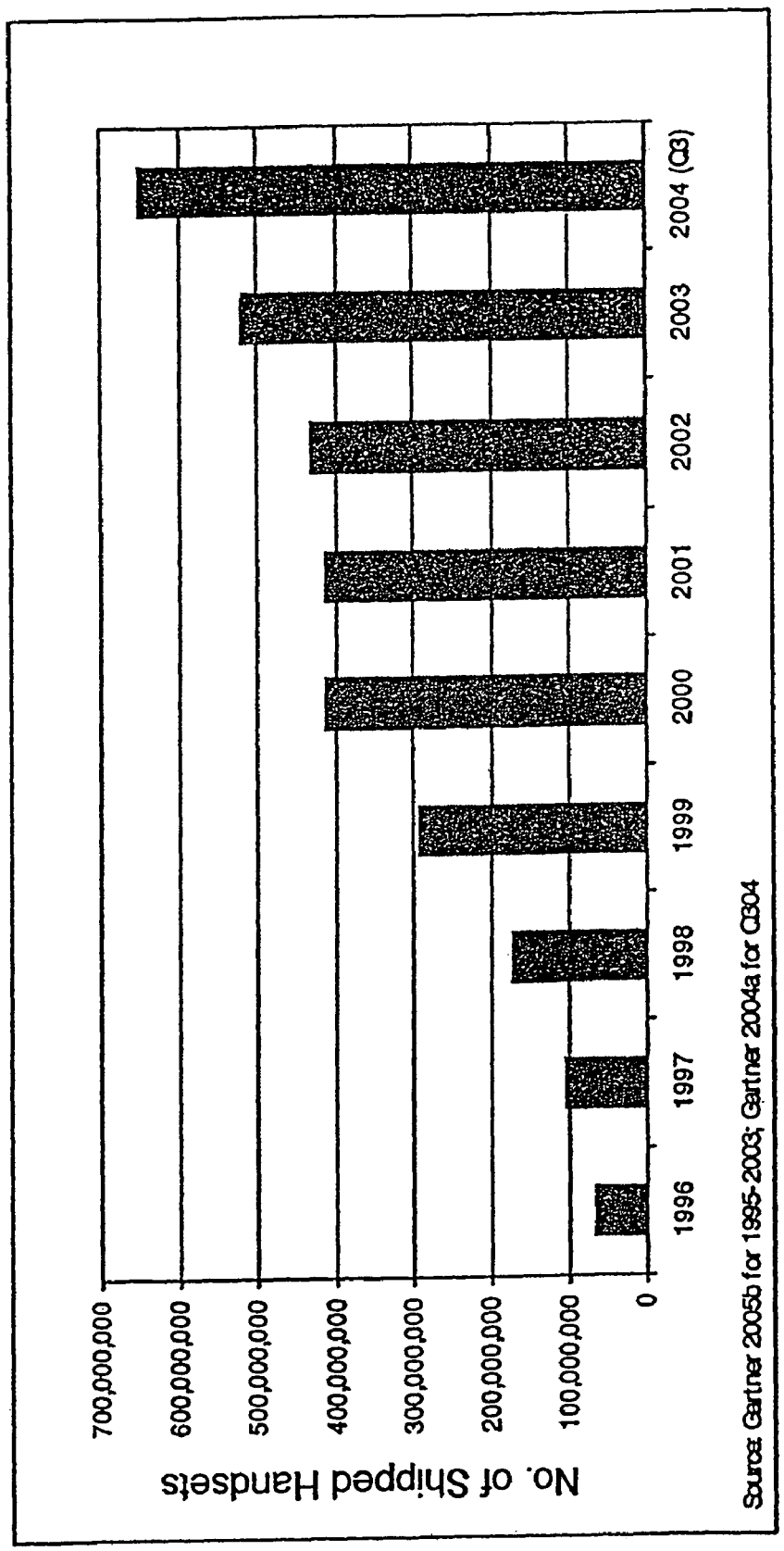
FIG. 2 shows a graph illustrating the amounts of mobile handsets shipped throughout the world during an eight year period.

As shown in FIG. 2, the total number of mobile handsets shipped out worldwide over an eight year period (1996-2003) has gradually grown over time, with a temporary leveling off during the recession that spanned from 2000 to 2002. Within the eight year time period, the annual global mobile handset shipments surged from well under 100 million to over half a billion in 2003. During the year 2003, forecasts for the year 2004 predicted annual global shipments ranging from 600 million handsets up to 650 million handsets.

Figure 3:
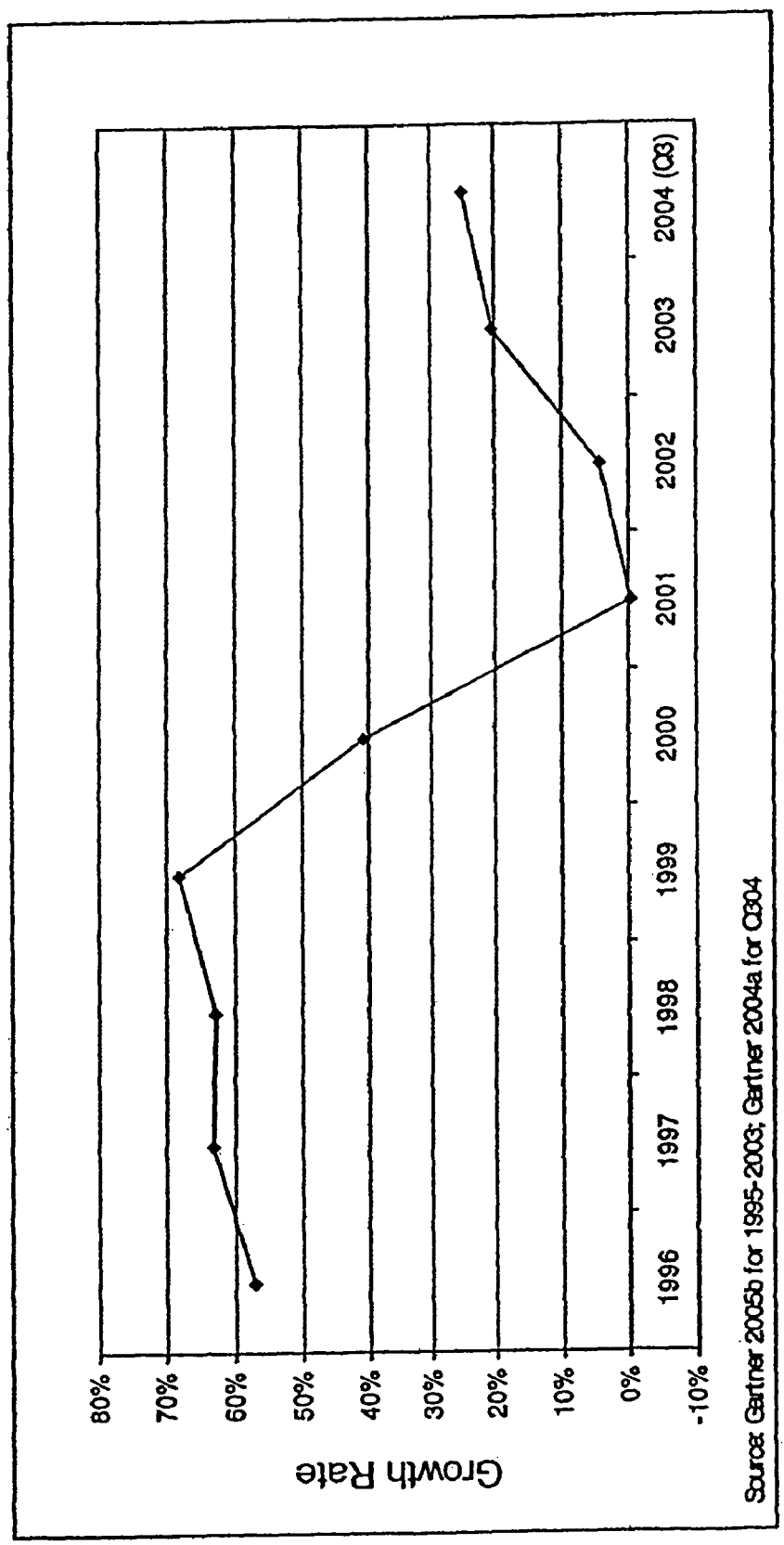
FIG. 3 shows a graph illustrating the growth rate of the mobile handset industry during an eight year period.

As shown in FIG. 3, after several years with growth rates of over 50 percent, the mobile handset industry came to an abrupt halt in 2001 when the market shrank slightly compared to 2000. While growth in the industry continues today, the fact that the rate of growth has declined when compared to the years 1996-1999 (ranging from 58% to 69% year-to-year change) indicates that the industry is maturing.

Besides growth, another market factor that is of interest when studying the mobile handset industry is market share. Longitudinal studies provide strong evidence that new industries are fragmented, and that they tend toward consolidation as they mature with time. The most important measures of consolidation in an industry are the n-firm market share and the Herfindahl Index. The former represents the combined market share of the n-largest companies within any given market. Although a valuable indicator for the degree of concentration of an industry, it lacks differentiation to reflect the size of the n-largest firms fairly. For instance, in the case where n=3 and the biggest company controls 80 percent and the second and third largest firms each control 5 percent, the 3-firm indicator will be 90 percent (80 percent+5 percent+5 percent). However, when the three largest firms each control 30 percent of the market, the 3-firm indicator has the same value of 90 percent (30 percent+30 percent+30 percent). Thus, the n-firm market share does not take into account the different market shares between the n firms.

To take into account the different market shares of the n-largest firms better, the Herfindahl Index is employed. The Herfindahl Index equals the sums of the squares of the market shares of all competitors. Hence, the Herfindahl Index can be any value between 0 and 10,000, moving from a very large number of very small firms to a single monopolistic producer. In general, Herfindahl indices between 1,000 and 1,800 are deemed to be moderately concentrated, and indices above 1,800 to be concentrated. Although concentration as measured by the n-firm rule or the Herfindahl Index is a strong proxy for consolidation, it does not necessarily imply strong merger and acquisition-like take-over activities. Organic growth of a few companies paired with the disappearance of other competitors is also possible, although highly unlikely as industries mature.

Figure 4:
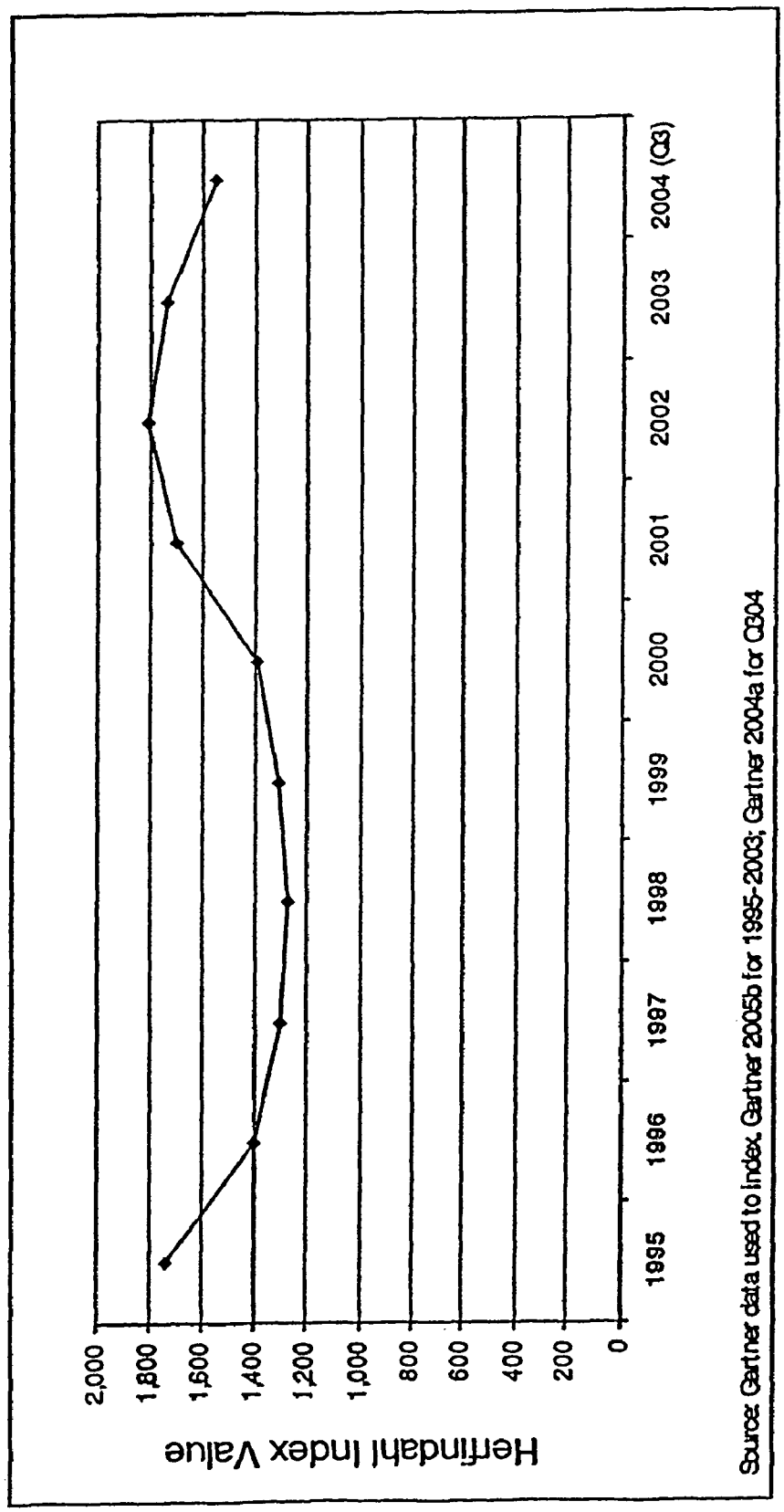
FIG. 4 shows a graph illustrating the market concentration in the mobile handset industry during an eight year period.
Figure 5:
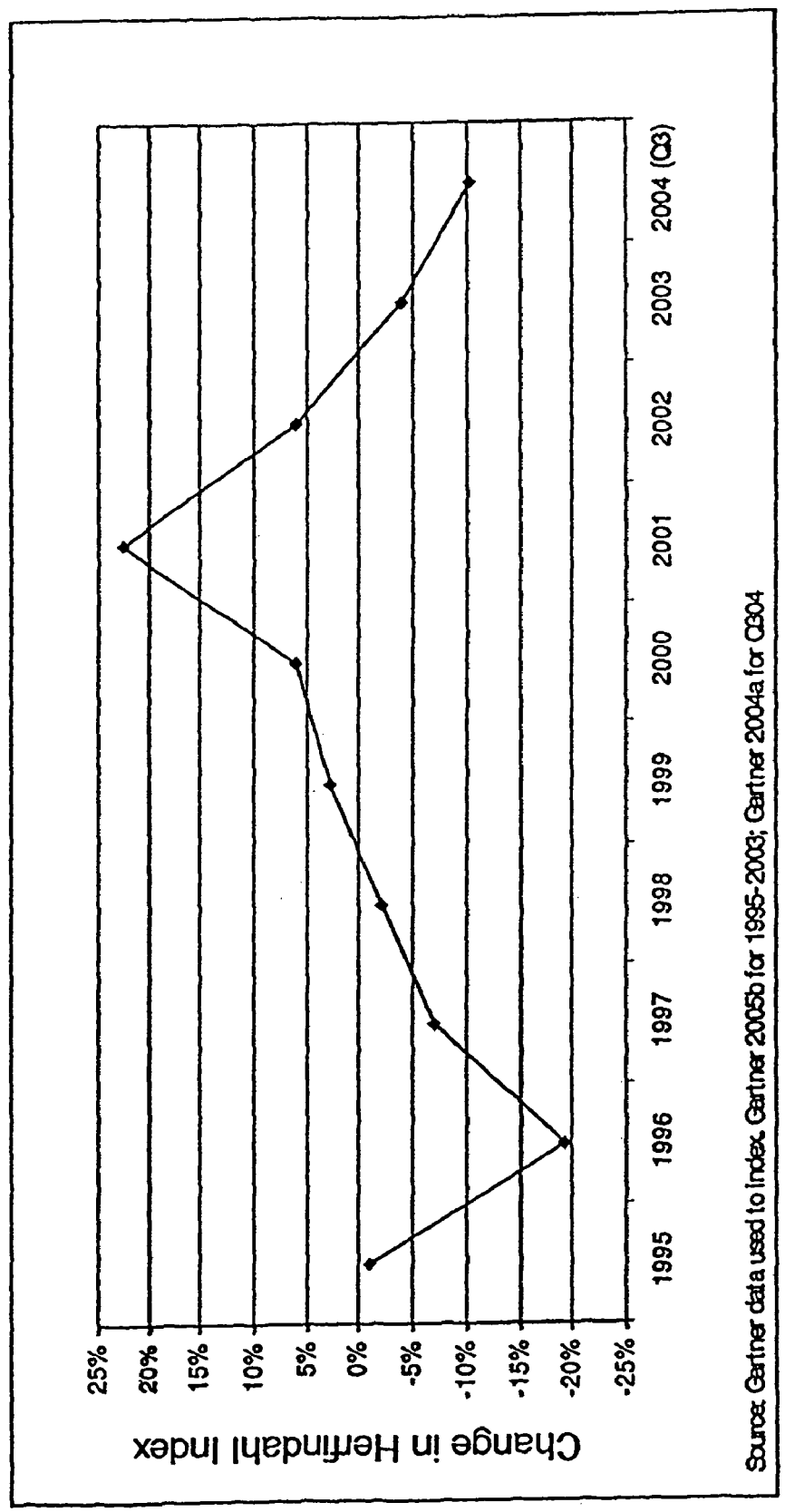
FIG. 5 shows a graph illustrating the change in market concentration in the mobile handset industry during an eight year period.

In the case of the mobile handset industry, historic data shows changing concentration levels over the years 1996-2003. As shown in FIG. 4, the Herfindahl Index alternated between about 1,200 and 1,800 between 1996 and 2003. After an initial decline in concentration from 1995 to 1998, the mobile handset industry concentrated from 1999 to 2002, to peak in 2001. From 2003 to 2004, the market again became less concentrated. This range is achieved by strong year-over-year changes of the mobile handset industry concentration as shown in FIG. 5.

Having identified the parameters of industry concentration and number of shipments as being of interest, there is a pattern between combined growth, in terms of year-over-year change in global shipments, and concentration of market share, in terms of year-over-year change in the Herfindahl Index. In particular, a fundamental underlying concept that is employed by the present invention is the product/industry lifecycle theory on the sales volume of a product over its lifecycle. In this theory, the initial growth phase of an industry is characterized by low volumes of shipments/sales of product but changes in volume over periods of time that are high. Over time, volumes of product sold/shipped per period of time rise but the increase in shipments/sales from period to period decreases. When the market matures, the volumes of product sold/shipped start to decline, i.e. the increase has turned into a decrease. In the end, the product is discontinued when the volume approaches zero.

The above described demand view can be combined with a supply side view (industry concentration) as will be described later. In the supply side view, the observation is that as an industry matures it tends to concentrate, i.e. fewer companies are controlling an increasing market share. Typically, demand predictions are more reliable than predictions on industry concentration. Thus, when the demand is expected to decrease, the industry concentration (supply side) is expected to increase and vice versa.

With the above theories in mind, strong changes in shipment growth seem to be linked to weak changes in concentration of market share and vice versa. This is illustrated in FIG. 6 wherein the yearly change in the growth rate or shipment of mobile handsets shown in FIG. 3 is plotted versus the-yearly change in the Herfindahl Index shown in FIG. 5.

Figure 6:
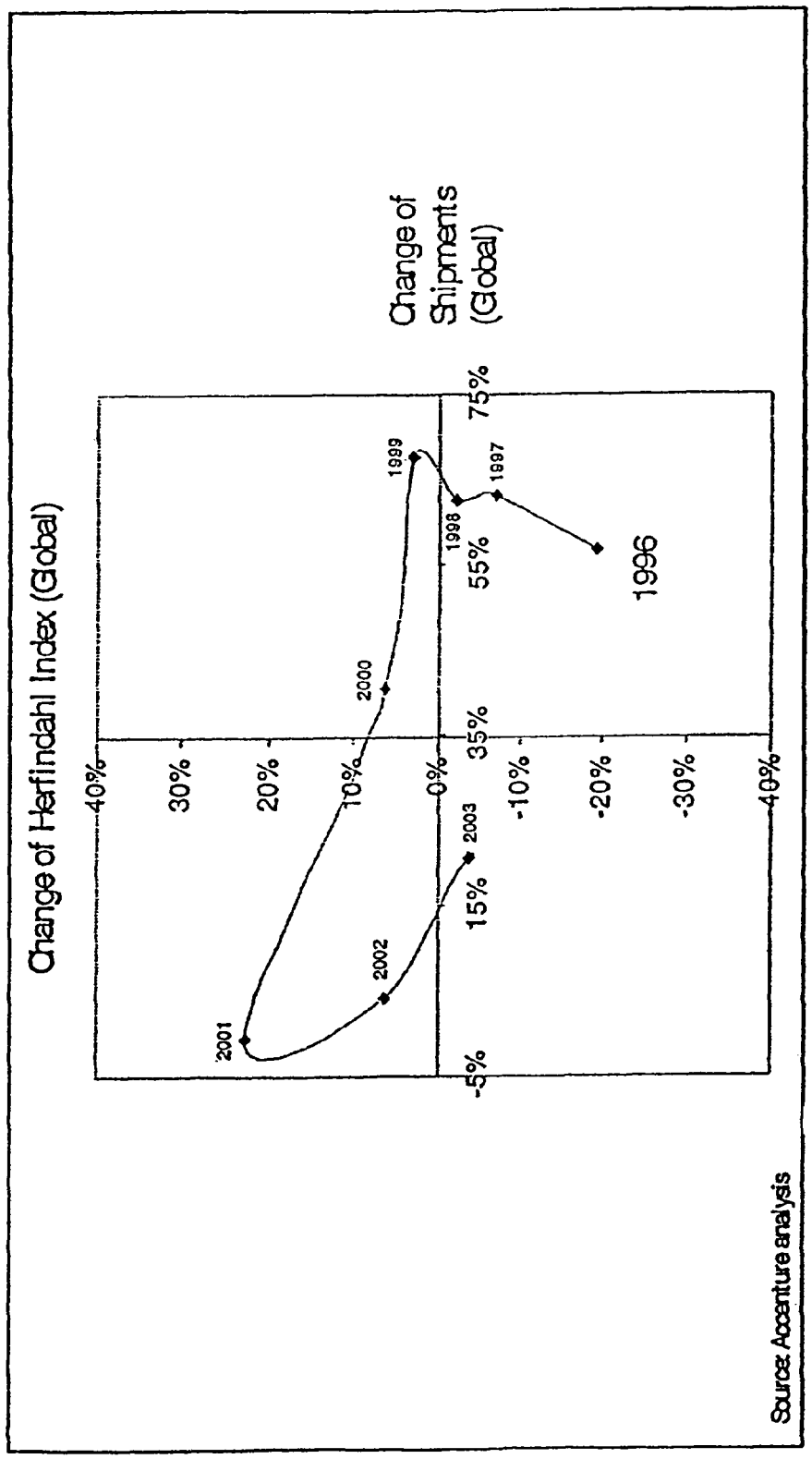
FIG. 6 shows a graph illustrating the change of shipments of mobile handsets shipped throughout the world and the change in market concentration during an eight year period.

A summarization of the eight year span from 1996 to 2003 is shown in FIG. 6. Starting in 1996, strong shipment growth of over 50 percent went along with a substantial decrease in market concentration, even as the Herfindahl Index declined by over 20 percent. The strong growth continued until about 1999, albeit already paired with a smaller decline of market concentration. After 2000, a year without many changes in terms of shipments and concentration, the mobile handset industry became strongly concentrated in 2001 and 2002, as growth came to a halt as the market shrank slightly. As soon as substantial growth returned to the industry in 2003, concentration declined almost immediately. Based on information as of 2003, using techniques per the present invention the concentration for the year 2004 was expected to strengthen and it in fact did strengthen.

Figure 7:
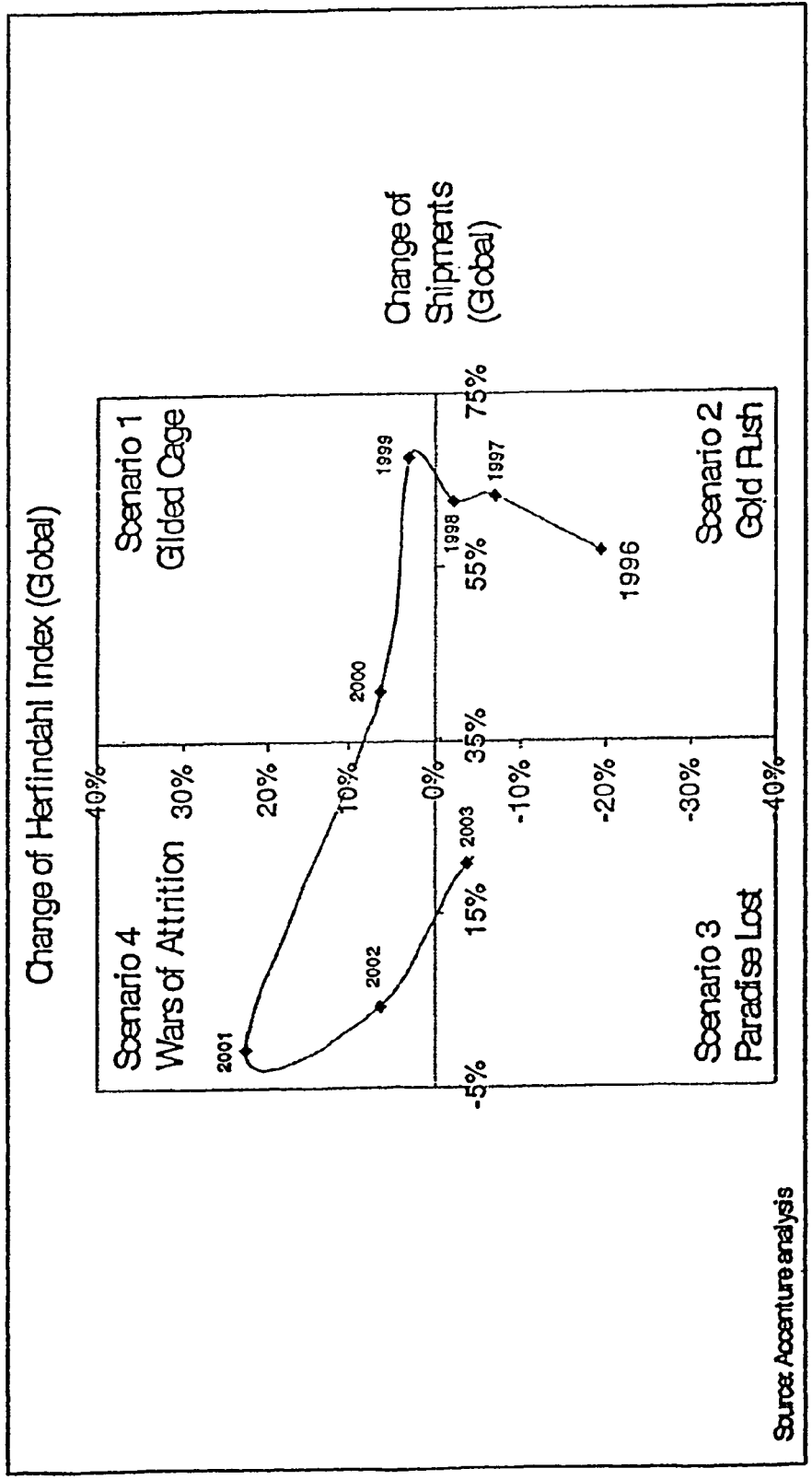
FIG. 7 shows the graph of FIG. 6 wherein four industry scenarios have been identified.

Four scenarios seem to be theoretically possible for the mobile handset industry. The four scenarios are: 1) "Gilded Cage" where there is very strong market concentration paired with growth—only possible in a regulated environment or short-term transition phase, 2) "Gold Rush" where there is hyper-growth and strong decline of industry concentration, 3) "Paradise Lost" wherein there is steady growth (globally)

paired with convergence and 4) "Wars of Attrition" wherein there is little growth or stagnation of demand which results in concentration and, ultimately, industry consolidation. With the above definitions in mind, the plot of FIG. 6 can be divided into four sectors as shown in FIG. 7. The mobile handset industry for a particular year is characterized by the scenario associated with the quadrant that contains the data point for that particular year.

The "Gilded Cage" and "Gold Rush" scenarios assume a very strong- to hyper-growth environment. Under normal circumstances, a fragmented market should develop very quickly as many new competitors enter the market to participate in the "Gold Rush" and to benefit from extraordinary growth. This could be observed from 1996 onwards, with growth rates exceeding 50 percent annually. A "Gilded Cage" scenario with similar growth rates could only be possible for a very short time period, either as a transition phase or in a monopolistic environment based on strict industry regulations that foster monopolistic competition and serve as a strong barrier to entry.

If growth is less, excessive, or even limited, the "Paradise Lost" and "Wars of Attrition" scenarios should reflect the overall industry mechanism. Strong concentration and merger endgames are likely to pick up quickly if market demand slows down or even shrinks. After all, one company's substantial market share increase works to the detriment of its competitors. Mergers and acquisitions should result in an industry shake out. This is the long-term scenario that should hold true for any industry. However, over the short- to mid-term period, large incumbent players may find that their former paradise has been lost to plenty of new market entrants. Such a constellation is likely in an environment where innovations change the rules of competition or the industry as a whole.

The above discussion shows how charting certain market data can lead to the characterization of a market of interest, such as the mobile handset market, for one or more years in the past. Applicants have determined that the market of interest can be characterized in the future as well. This is accomplished by obtaining subjective data from experts in the market or industry in question, such as the mobile handset market, and officials of a representative number of companies that establish the market in question. Such group of experts would be selected like those used in a Delphi type of analysis. The subjective data is then combined so that it can be determined which of the four scenarios "Paradise Lost," "Gold Rush," "Wars of Attrition" and "Gilded Cage" will apply to the market/industry in the future.

As shown in FIGS. 8A-C, a number of questions are presented to the market experts or officials. Some questions regard major trends in the industry while other questions regard minor trends. The questions can be separated into seven distinct classes: 1) question related to the supply aspect of the market, 2) questions related to the demand aspect of the market and corresponding to the change of shipments/x-axis of the charts of FIGS. 6 and 7, 3) questions related to the structure/competition of the market and corresponding to the change of Herfindahl Index/y-axis of the charts of FIGS. 6 and 7, 4) questions related to infrastructure, 5) questions related to regulatory policies, 6) question regarding the likelihood of the market entering one of the four scenarios in the future and 7) questions regarding attributes of the interviewees.

The questions are presented to the market experts and officials and they answer them to the best of their knowledge. As shown in FIGS. 8A-B, there are 38 questions asked to resolve the general question "which market structure do you expect in five years in the interviewee's industry?". In addition, there are 22 questions asked to resolve the general question "Which demand behavior do you expect in five years in the interviewee's industry?" The 60 questions are divided into 30 pairs of question, wherein one question in each pair reflects a positive scenario for the industry while the other question reflects a negative scenario for the industry. The answers are assigned a point value ranging from +3 to +1, wherein for both positive and negative scenario questions +3 denotes very likely, +2 denotes likely, +1 denotes could be. However, as described below, a positive question value will affect the future point in one direction while a negative question value will affect the future point in an opposite direction.

Next, the interviewee is asked to choose which of six market developments is expected to be the primary cause for consolidation in the industry (FIG. 8A). In addition, the interviewee is asked to choose which of six risk factors is the most significant for the development of demand in the industry (FIG. 8B).

The interviewee is also asked to grade 12 value added services as to their likelihood that they will be used in more than 10 percent of households in five years time (FIG. 8B). Such grading is from 1 to 6, wherein a grade of "1" represents an answer of "definitely not" and a grade of "6" represents an answer of "very likely."

The interviewee is asked to predict the likelihood for each of the four scenarios shown in FIG. 7 that it will prevail in five year time. The prediction is done on a scale of 1 to 3, wherein "1" represents an answer of "could be" and "3" represents the answer of "very likely." (FIG. 8C)

The interview is also asked about what measures need to be taken by the interviewee's company to achieve the "Gold Rush" scenario in five years. Furthermore, the interviewee, is asked to characterize his or her company by size and by type of company. (FIG. 8C).

After the answers are completed, they can be grouped in accordance with the seven distinct classes mentioned previously: 1) question related to the supply aspect of the market (FIG. 9A), 2) questions related to the demand aspect of the market (FIGS. 9B-C), 3) questions related to the structure/competition of the market (FIG. 9D), 4) questions related to infrastructure (FIG. 9E), 5) questions related to regulatory policies (FIG. 9F), 6) question regarding the likelihood of the market entering one of the four scenarios in the future (FIG. 9G) and 7) questions regarding attributes of the interviewees (FIG. H). Such grouping can include the number of interviewees answering a question and the mean value of their answer.

Note that the 88 questions and answers presented in items 1a-3a of FIGS. 8A-C and 9A-G can be categorized as to how they move the future data point, either vertically or horizontally, within the 2×2 matrix. This categorization is presented in FIGS. 10A-C wherein for each of the 88 answers a directional value is assigned, such as W=Few (number of) providers, V=Many (number of) providers, B=(Demand for) Basic services and M=(Demand for) Multimedia services. In general, an answer that is assigned the directional value W means that the answer causes the future point to move downward within the 2×2 matrix. An answer that is assigned the directional value V means that the answer causes the future point to move upward within the 2×2 matrix. An answer that is assigned the directional value B means that the answer causes the future point to move leftward within the 2×2 matrix. An answer that is assigned the directional value M means that the answer causes the future point to move rightward within the 2×2 matrix. Thus, forty four of the questions are dedicated to the x-axis of the 2×2 matrix while the other forty four questions are dedicated to the y-axis of the 2×2 matrix.

After the 88 answers for the questions of 1a-3a are completed for each of the interviewees, then the following $X_n(t)$, $Y_n(t)$ coordinates of a data point in the 2×2 matrix are determined for each interviewee n=1, 2, 3, ... $N_{TOT}$, wherein $N_{TOT}$ is the total number of interviewees:

$$X_n(t) = 1/N_x \sum_{i=1}^{N_x} q_{nxi};$$

$$Y_n(t) = 1/N_y \sum_{j=1}^{N_y} q_{nyj}$$

Wherein $q_{nxi}$=the value (1, 2, 3, 4, 5, 6) of the ith question given to the nth interviewee, wherein the ith question has been categorized as either a B or M type question;

$q_{nyj}$=the value (1, 2, 3, 4, 5, 6) of the jth question given to the nth interviewee, wherein the jth question has been categorized as either a W or V type question;

i=1, 2, 3, ... $N_x$
j=1, 2, 3, ... $N_y$
$N_x$=total number of questions categorized as either a B or M type question;
$N_y$=total number of questions categorized as either a W or V type question;
$N=N_x+N_y$=total number of questions categorized as either a B, M, W or V type question.

The data point (X(t), Y(t)) associated with the industry of the experts is then calculated as follows:

$$X(t) = 1/N_{TOT} \sum_{n=1}^{N_{TOT}} X_n(t)$$

$$Y(t) = 1/N_{TOT} \sum_{n=1}^{N_{TOT}} Y_n(t)$$

Figure 11A:
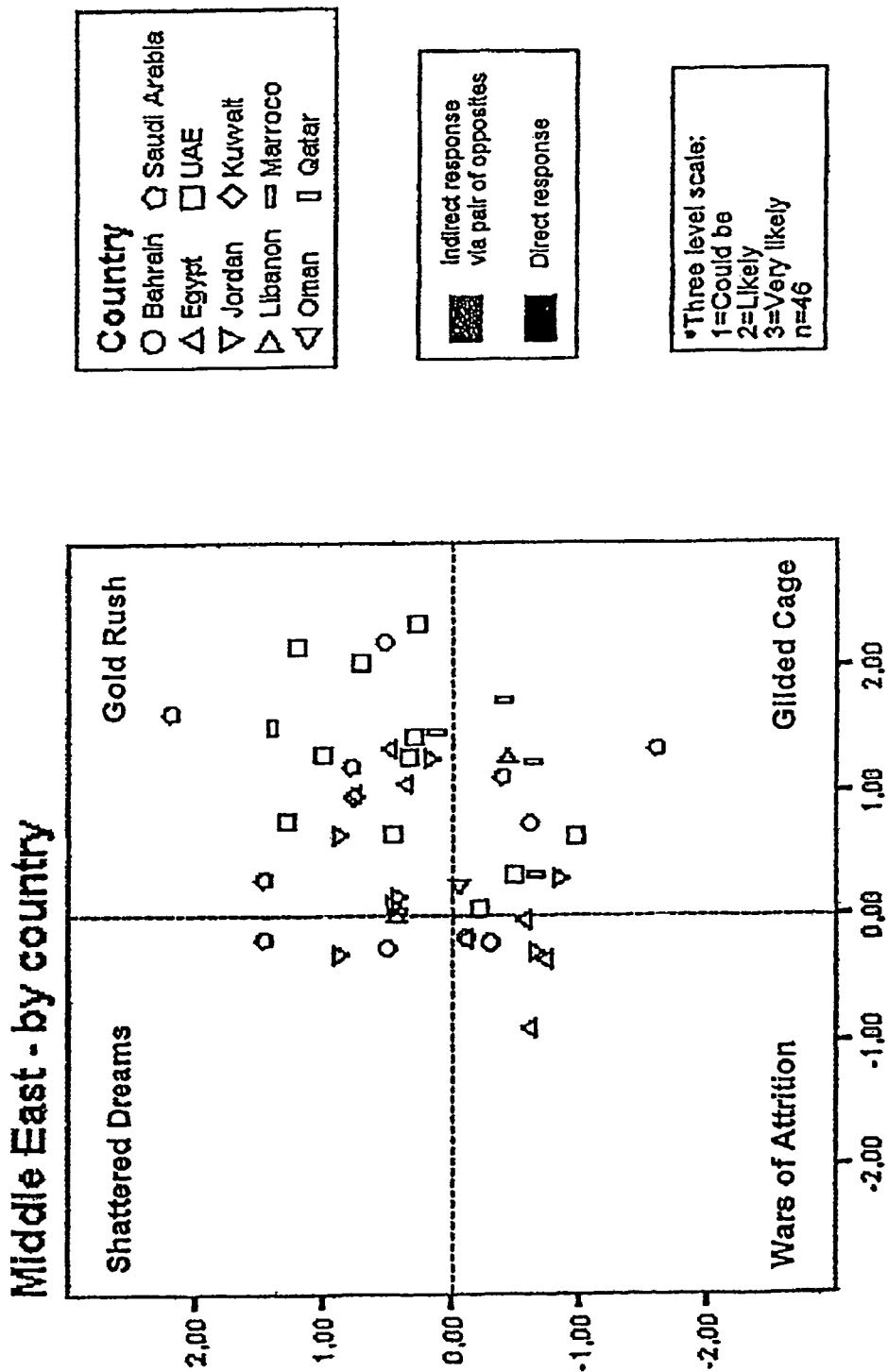
Figure 11B:
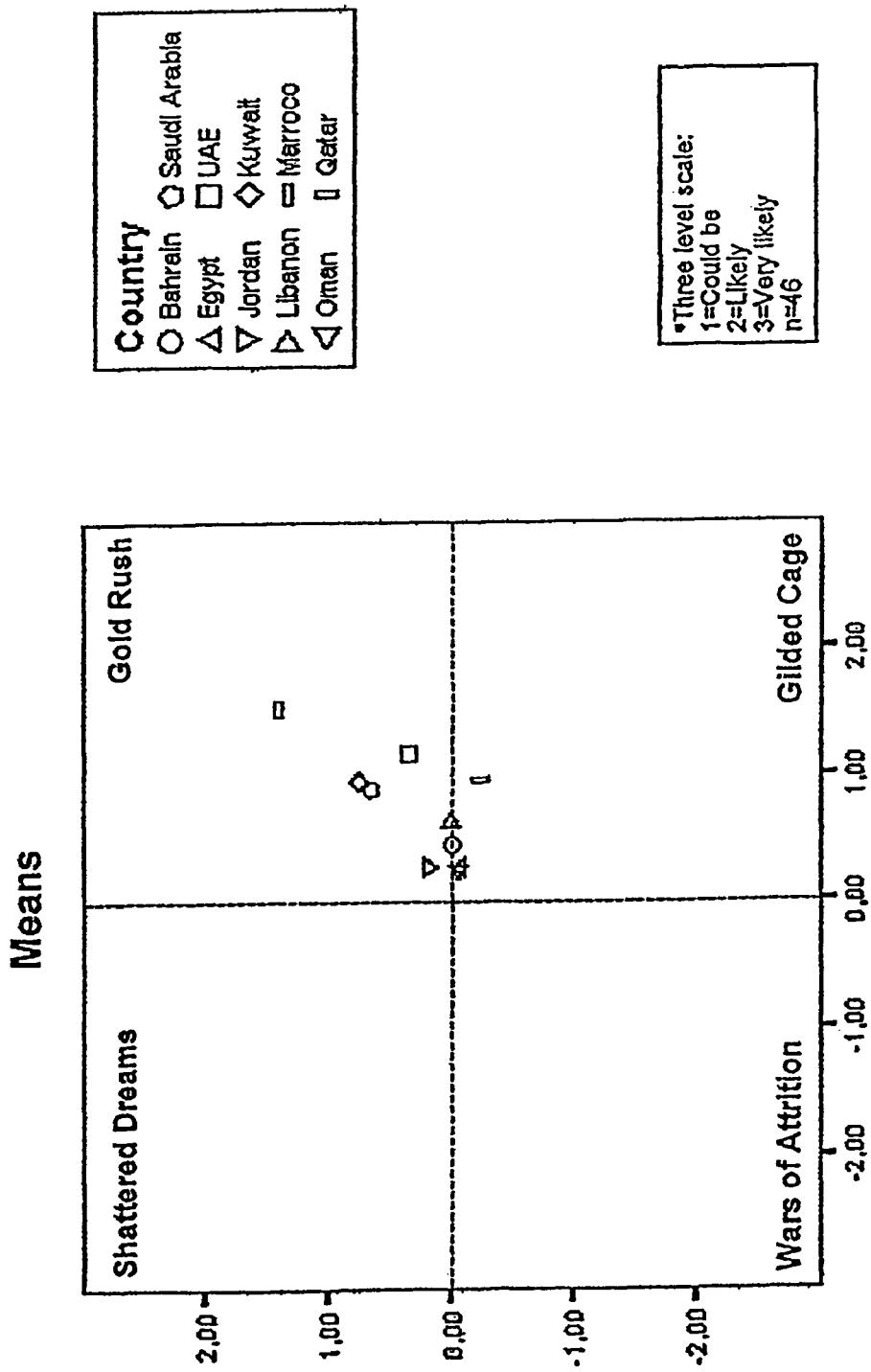

The data points $(X_n(t), Y_n(t))$ associated with the interviewees can be plotted in a 2×2 matrix similar to that shown in FIG. 7, except that the scenarios have been reversed in position. One possibility for analyzing the results is to plot the point (X(t), Y(t)) in the 2×2 matrix as prediction of a future scenario for the industry. Another possibility for analyzing the results is to assign each of the points of the interviewees to the country to which the company of the interviewee is associated. For example, FIG. 11A shows the case where the results are categorized by the Middle Eastern countries in which the companies of the interviewees are based. The results can be further simplified by averaging the data points of FIG. 11A associated with each country as shown in FIG. 11B.

Figure 11C:
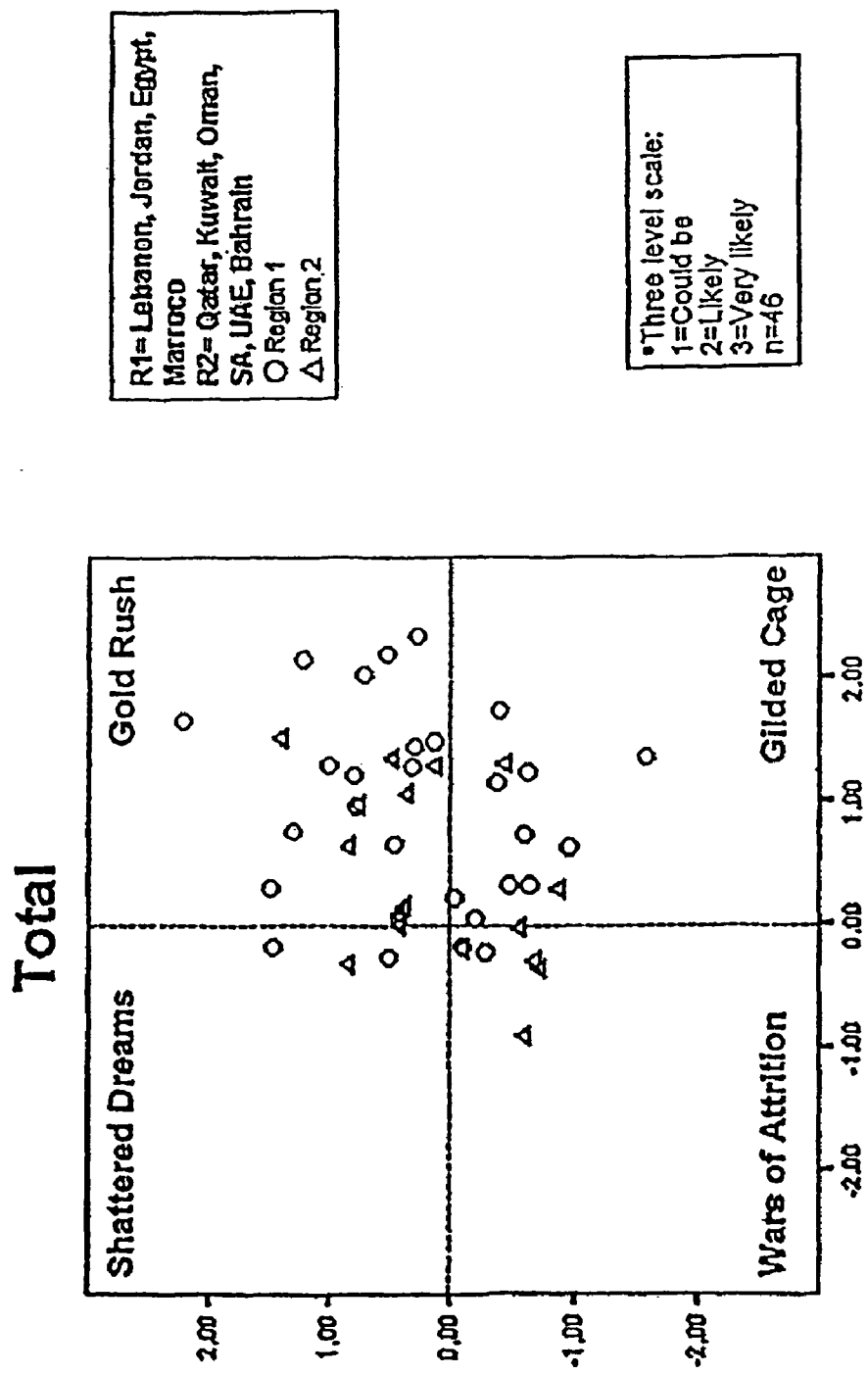
Figure 11D:
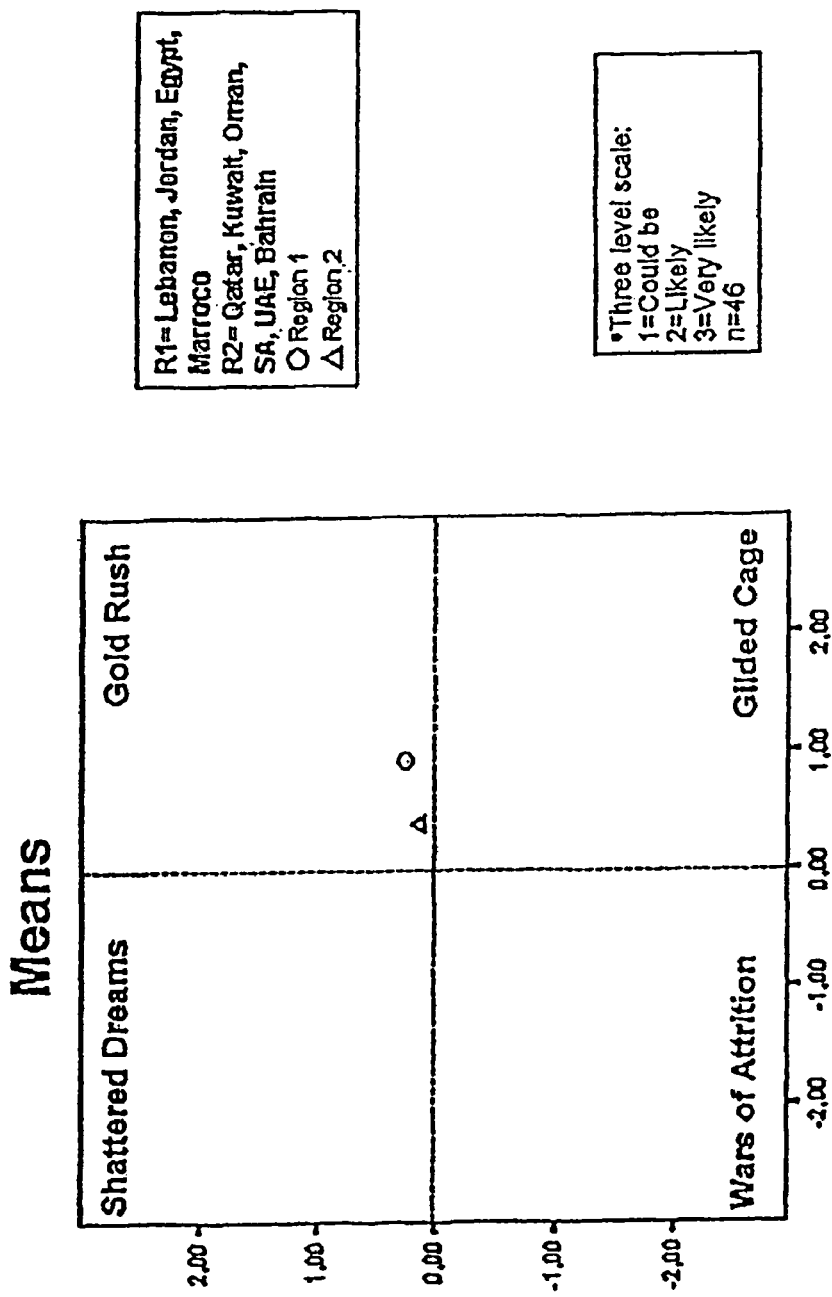

The results can be categorized by geographical regions such as those shown in FIG. 11C. The results can be further simplified by averaging the data points of FIG. 11D associated with each region.

Figure 11E:
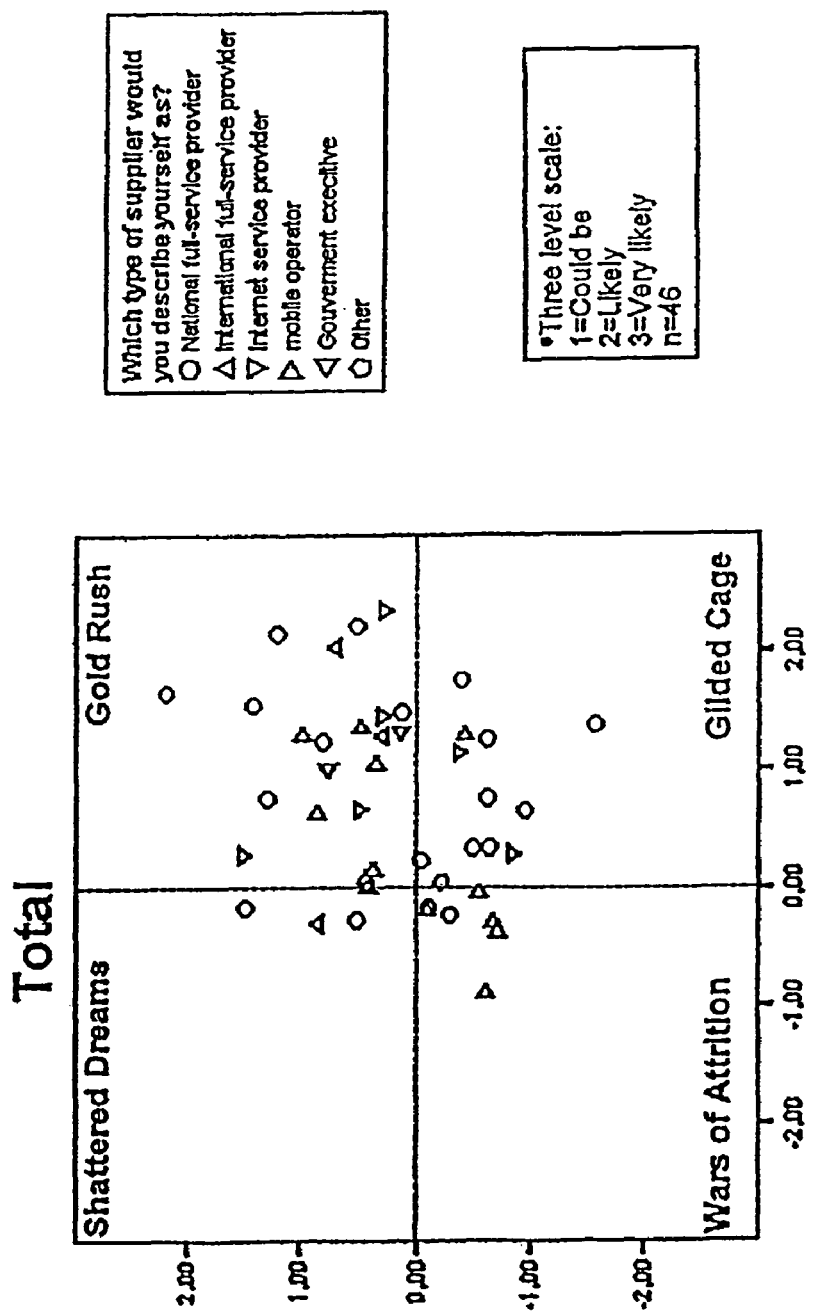
Figure 11F:
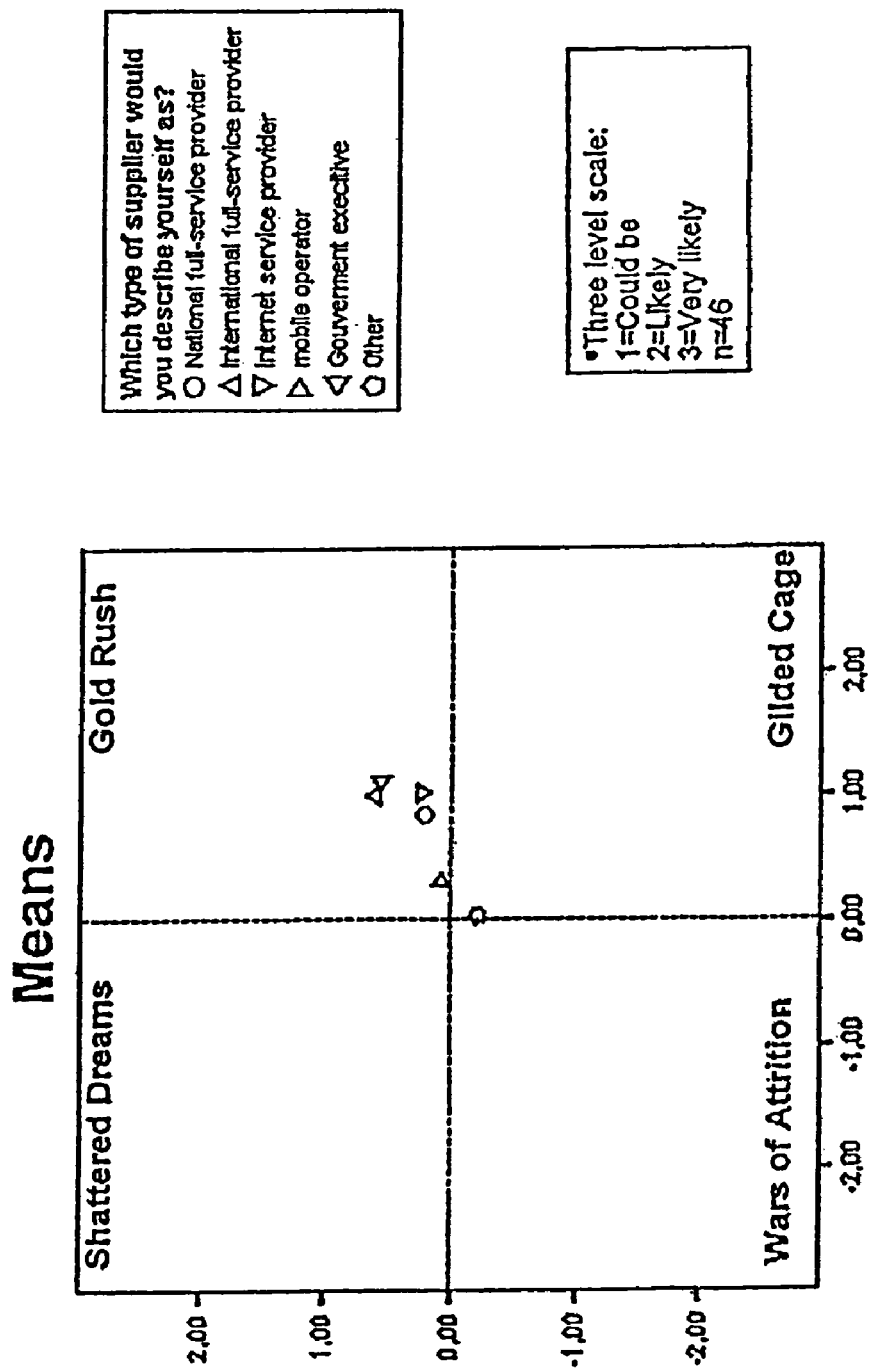

In another version, each of the points of the interviewees is assigned to the type of supplier to which the company of the interviewee is associated as shown in FIG. 11E. The results can be further simplified by averaging the data points of FIG. 11E as shown in FIG. 11F.

Figure 11G:
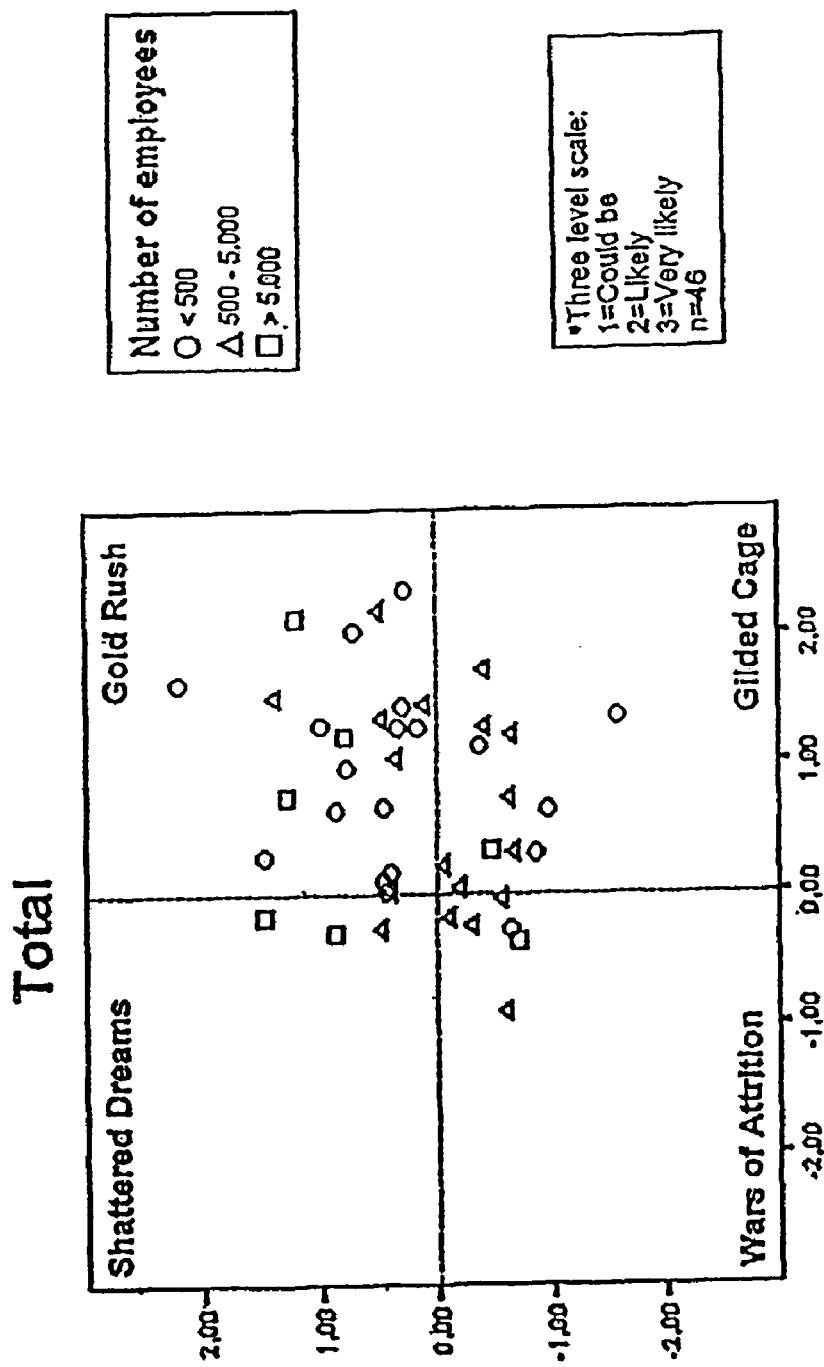

In another version, each of the points of the interviewees is assigned to the number of employees of the company of the interviewee is associated as shown in FIG. 11G. The results can be further simplified by averaging the data points of FIG. 11G as shown in FIG. 11H.

As shown by the questions of items 1a, 2a-b and 3a of FIGS. 8A-8C and FIGS. 9A-9H, the questions regard the expectations of the interviewees five years in the future from the date that the interviewees answered the questions. Thus, if the questions were answered in the year 2003, then the 2×2 matrices of FIGS. 11A-H provide information regarding the future of the mobile handset industry in the year 2008 in the Middle East. For example, it appears that FIGS. 11B and 11D indicate that the mobile handset market for a majority of Middle Eastern countries will be in the so-called "Gold Rush" scenario mentioned previously. Also, most types of mobile handset suppliers and sizes of handset companies will be in the Gold Rush scenario in the year 2008 per FIGS. 11F and 11H.

In the methodology of FIGS. 8-11, a 2×2 matrix is generated which defines the four scenarios "Paradise Lost," "Gold Rush," "Wars of Attrition" and "Gilded Cage" and is applicable for a future point of time. However, the 2×2 matrix of FIGS. 11A-H does not provide any specific predictions regarding values of market parameters, such as industry concentration and number of units sold/made, for an industry. In contrast, the methodology of FIGS. 1-7 does generate a 2×2 matrix with market parameters. While the two methodologies use different data, they still are able to generate a 2×2 matrix that defines the same four scenarios that describes an industry. Therefore, there is a relationship between the two methodologies. For example, a number of the questions listed in FIGS. 8A-C are related to the industry parameters of industry concentration and number of units sold/made. Reducing the number of questions used in the methodology of FIGS. 8-11 so as to use questions related to the past measured parameters used in the methodology of FIGS. 1-7 can be a way to obtain the future value X(t), Y(t) for the same parameters. Besides reducing the number of questions, the two parameters used in the methodology of FIGS. 1-7 can be increased in number so as to provide better correlation with the methodology of FIGS. 8-11.

Figure 12:
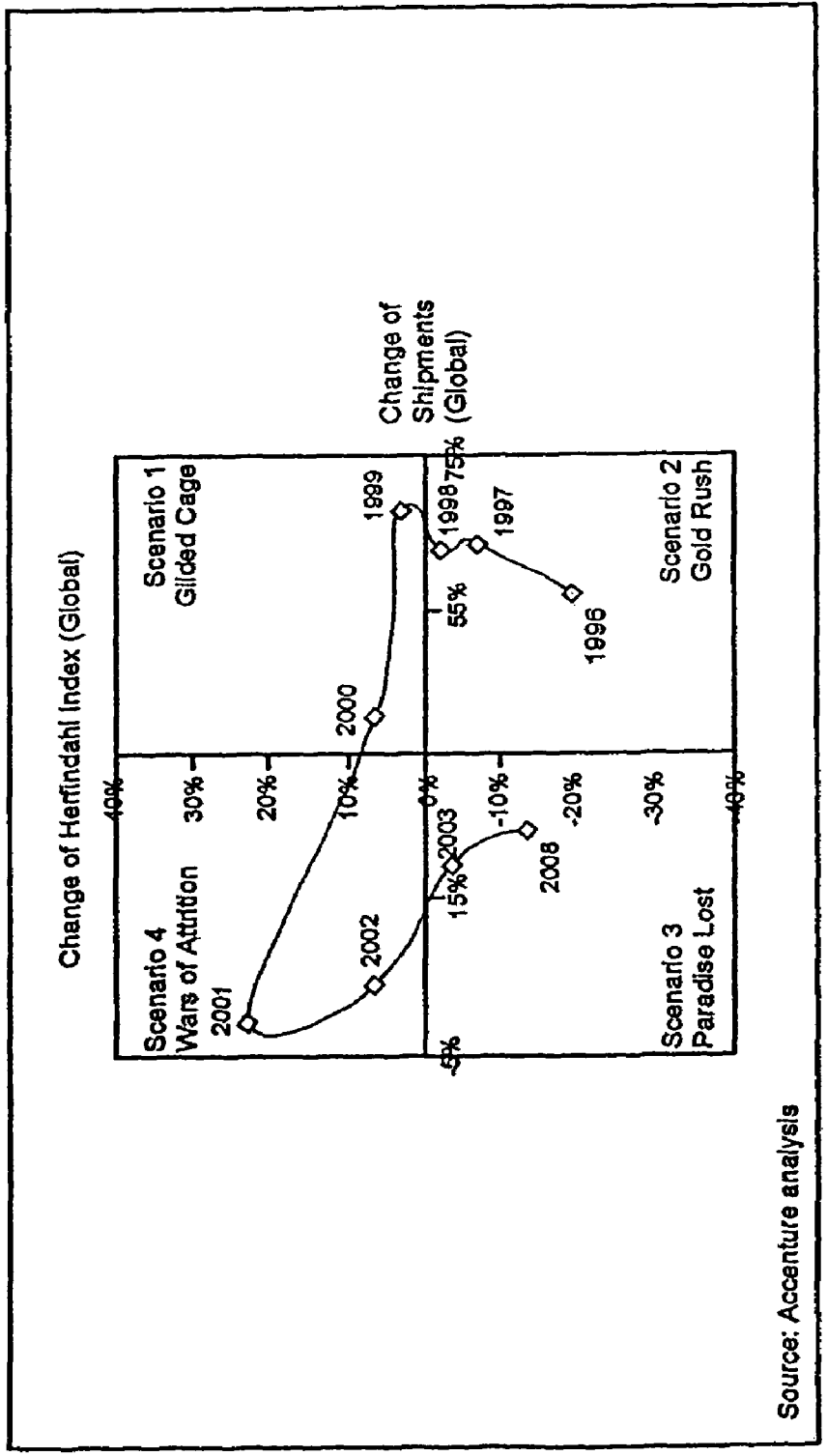
FIG. 12 shows the graph of FIG. 7 wherein a future industry data point is generated in accordance with the present invention and added to the graph.

The relationship between the two methodologies can be determined in another way. In particular, a plurality of future points $((X(t_1), Y(t_1)), (X(t_2), Y(t_2)), \ldots)$ can be generated by performing the questionnaire of FIGS. 8A-C at multiple times in time, such as every five years. For each year that the questionnaire is performed, the corresponding point is determined for the 2×2 matrix of FIG. 7. From the plurality of future points generated from the questionnaire and the corresponding points, a mathematical relationship can be established between the points. With the mathematical relationship determined, the future point (X(t), Y(t)) generated per FIGS. 8-11 can then be converted to a future point that can be added to the 2×2 matrix of FIG. 7 and added to the plot shown in FIG. 12. As shown in FIG. 12, there is an expected future decrease in demand (in this case for mobile devices). Following the rationale and assumed underlying correlation as described above, such a decrease in demand is predicted to result in an increased industry concentration (supply side).

Figure 13:
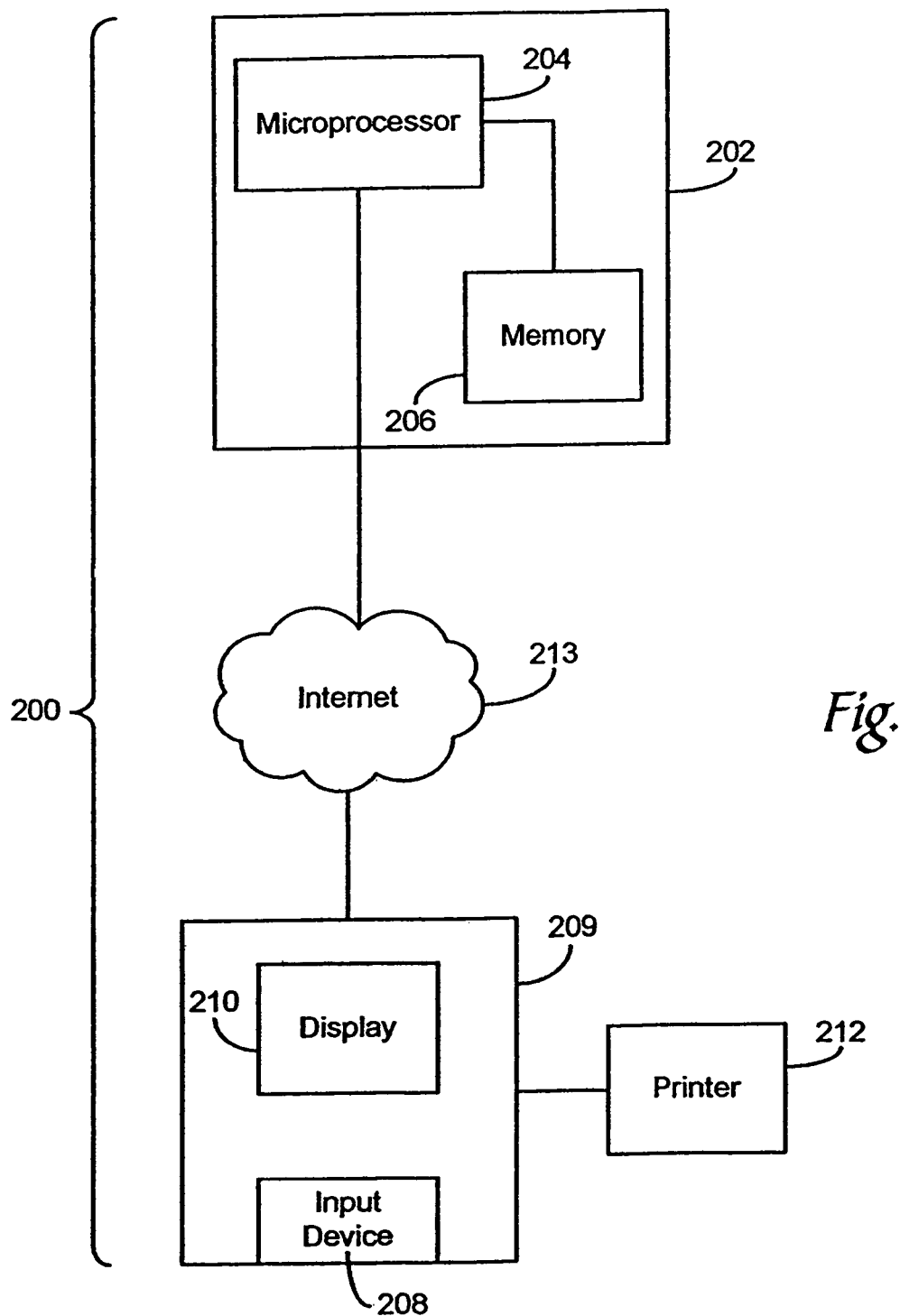
FIG. 13 shows an embodiment of an industry scenario mapping tool in accordance with the present invention.

With the above process in mind, there are a number of ways of implementing the process. For example, an embodiment of the present invention is shown in FIG. 13 in which schematically shows an industry scenario mapping tool 200 that includes an industry scenario mapping processor 202 that includes a microprocessor 204 electrically connected to a memory 206. The memory 206 has a structure so as to store and implement an industry scenario mapping program which includes several databases. One database includes the previously mentioned market data of the past and another database includes the data associated with the interview questions used to generate the future market data. The data associated with the interview questions include the questions, the answers, and the values for the answers. The microprocessor 204 has a structure so as to contain and run software for the industry scenario mapping program which generates 2×2 matrices like that of FIG. 7 and the individual interviewee/company data points and the single industry wide future data point mentioned previously with respect to FIGS. 8-12. The microprocessor 204 may also contain software to conform the matrices of FIGS. 7 and 11 A-H by reducing the number of questions used in the methodology of FIGS. 8-11, increasing the parameters used in the methodology of FIGS. 1-7 or determining the relationship between the two methodologies of FIGS. 7-11 by looking a plurality of future points in the manner described previously.

Data is input indirectly into the microprocessor 204 via an input device 208. Examples of possible input devices 208 are a keyboard, a microphone, a touch screen or a mouse that are part of computer hardware system, such as a laptop computer 209. A display 210 and a printer 212 can be electrically connected to or forms part of the computer hardware system.

As shown in FIG. 13, the laptop computer 209 may be connected to the off-site industry scenario mapping processor 202 via the Internet 213. In such a scenario, the processor 202 receives data from the laptop computer 209, processes the received data via the microprocessor 204 and memory 206. Thus, the data can be processed at a location different than the location of the laptop computer 209. This allows for flexibility in conducting the evaluation process.

Of course, it is possible to have a microprocessor and memory act of the laptop computer 209 have the same functionality as the microprocessor 204 and memory 206 so as to process the data by itself so that data does not need to be sent to the off-site processor 202. In this embodiment, laptop computer 209 can be taken to an interview by the interviewer. At the interview, the interviewer asks the various questions and enters the answers. The interviewer can evaluate the answers directly on the laptop computer 209 or the results can be sent offsite to the offsite processor 204 via the internet 213 where they can be evaluated.

Let's assume that the advice screen shows the data of FIG. 12 and that the year is 2003. What does the information of the 2×2 matrix of FIG. 12 tell the user in the year 2003? The screen shows that the industry has recently entered into the "Paradise Lost" scenario and that the 2008 prediction (calculated per the questionnaire process of FIGS. 8-11) is that the industry will drive further into the "Paradise Lost" scenario. As mentioned previously, this means that the industry is encountering steady global growth paired with convergence in concentration in the industry. These are the signs of a maturing industry.

Figure 14:
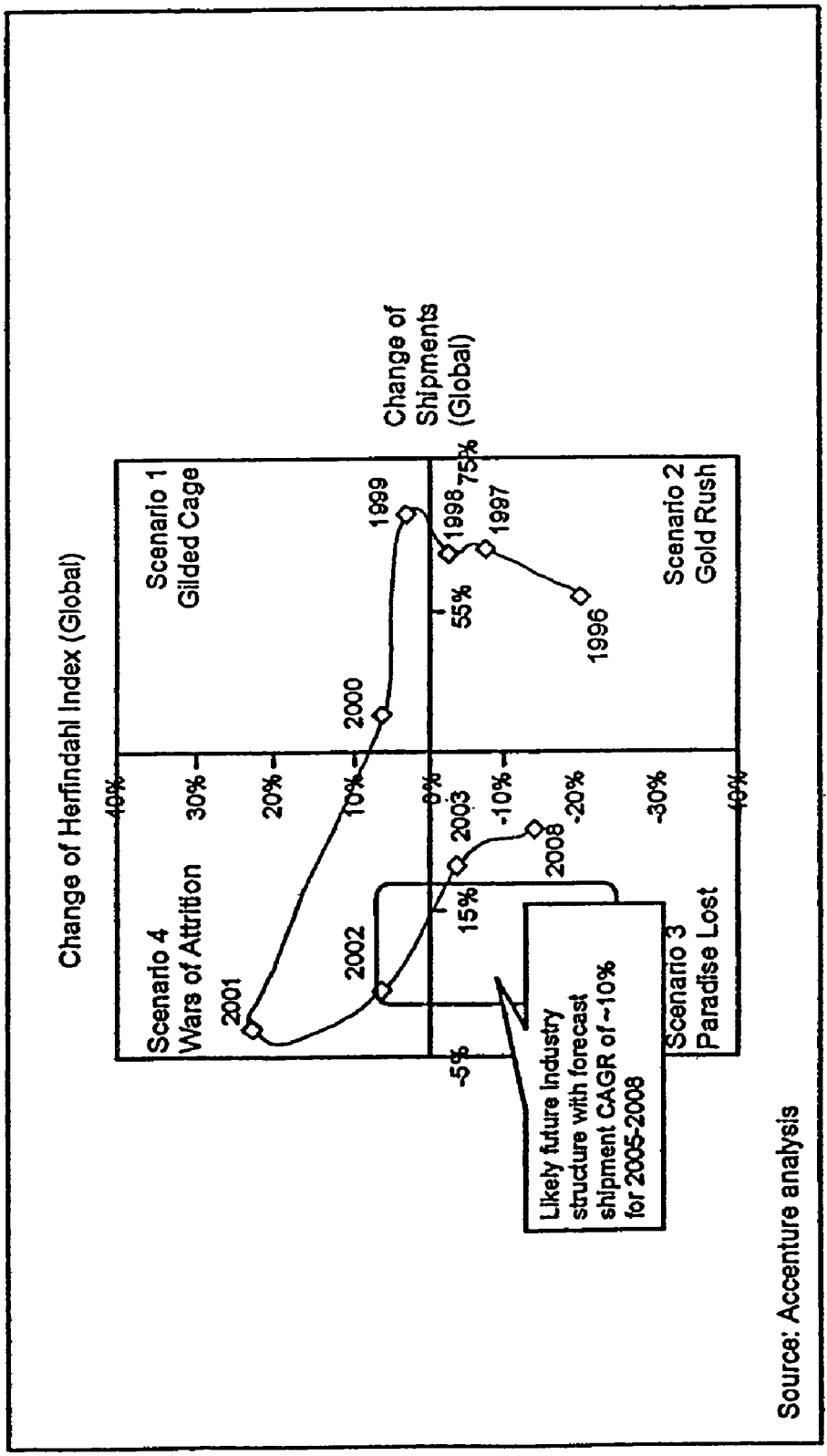
FIG. 14 shows the graph of FIG. 12 wherein a future market scenario is predicted from the display of the graph of FIG. 12 on a display of the industry scenario mapping tool of FIG. 13.

Due to the trend from 2003 to 2008 that the industry is diving deeper into the "Paradise Lost" scenario, the scenario is apt to be in play for the next three to four years as shown in FIG. 14. With different business models and success factors, the strategic direction of a company will need to be realigned with the emerging scenario. A user whose company is based on a consumer electronics-like market will, for instance, require particularly astute customer insight capabilities to ensure adequate understanding of market demand. For a user whose company is based in a mature market like the United States or Western Europe, being on top of design and user interface trends will be key to capturing more market share with consumers.

Figure 15:
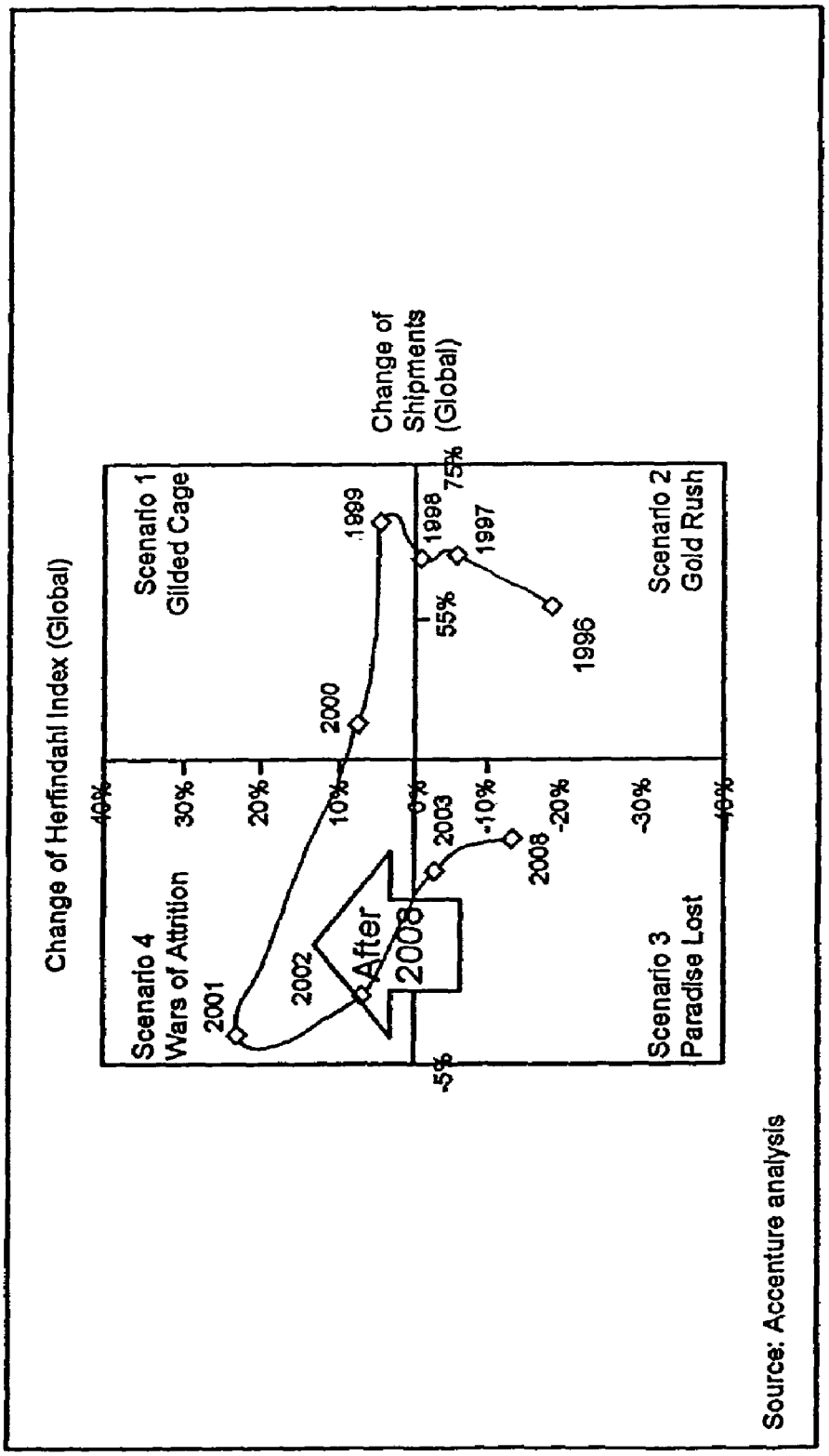
FIG. 15 shows the graph of FIG. 12 wherein a second future market scenario is predicted from the display of the graph of FIG. 12 on a display of the industry scenario mapping tool of FIG. 13.

Armed with certain knowledge, the 2×2 matrix can also give the user advice beyond the five year range mentioned above. For example, assume that it is predicted that by the year 2010, device shipments will reach almost one billion units worldwide targeting a global market of more than 2 billion users. Within this time frame, the current emerging markets should begin to mature, with corresponding lower growth rates of handset shipments and lower net subscriber additions. Although global growth rates are expected to slow, the overall market will be enormous. Based on the above knowledge, a brisk "War of Attrition" may be the likely outcome in the year 2010 or so (see FIG. 15), in which slow industry growth and consumer demand lead to concentration and—ultimately—consolidation.

Another fact that the user may know is that by the year 2010 the 4G technology may be in place. Such technology could be the start signal for yet another realignment of the market as this new technology may impact market dynamics.

In summary, based on past market information and interview information from market experts, the system 200 via the advice screen showing the 2×2 matrix can show where an industry has been in the past and where it is going in the future. Furthermore, the advice screen implicitly provides suggestions on how an organization can take advantage of the future scenario by knowing of future trends and what type of market that the organization is a member.

In summary, the present invention provides a multidimensional (see FIG. 7), multiindicator (see questions and their measured underlying values with respect to the questionnaire of FIG. 8) and multidirectional (past/future) tool that is highly illustrative for describing industry trends. Based on an extensive set of indicators per the questionnaire methodology of FIGS. 8-11, it provides a holistic view on industry development. By leveraging two research sources (statistical evidence and data obtained through interviews), the tool is powerful in forecasting markets. The present invention provides a unique way to define the dimensions that define the four scenarios mentioned previously. Furthermore, the present invention provides a unique way to generate the four scenarios. In general, the present invention provides a unique approach of developing different dimensions to define different scenarios via the use of combinations of different market values. In one variation, an industry specific questionnaire is mostly non quantitative but rather based on the expectations of a selected survey group. In the second variation, quantitative demand and supply figures are used—both past data and future predictions. The variation in the concentration on the supply side and in the change of demand defines the scenarios in this variant.

The invention may be embodied in other forms than those specifically disclosed herein without departing from its spirit or essential characteristics. For example, the process can be applied to other industries and can be applied to different types of markets, such as regional and national markets. In such an application, the user needs to identify market factors, such as change in shipping and change in concentration, which can be used to map the four scenarios of FIG. 7. The described embodiments are to be considered in all respects only as illustrative and not restrictive, and the scope of the invention is commensurate with the appended claims rather than the foregoing description.

We claim:

1. A system for industry scenario mapping comprising:
a processor;
a visual display electrically coupled to said processor; and
a memory for storing instructions, that when executed by said processor prepares an advice screen to be shown on said visual display, said advice screen displaying a matrix comprising four scenario regions and containing a graph plotting two market factors that can be used to show which market scenario an industry is plotted to for a plurality of particular historical time periods, as well as displaying a data point representative of said industry at a future point in time, wherein the market scenario is one of the four scenario regions, and wherein said four scenario regions are defined by the following corresponding axes:

a rate of market share concentration paired with a first rate of market growth;

a rate of market share fragmentation paired with the first rate of market growth;

the rate of market share fragmentation paired with a second rate of market growth, wherein the second rate of market growth is less than the first rate of market growth; and the rate of market share concentration paired with the second rate of market growth.

2. The system of claim 1, wherein said data point representative of said industry at said future point in time is determined by:

combining subjective data that has been obtained about said industry; and determining from said combined subjective data which market scenario of said plurality of market scenarios will apply to said industry during said particular time period in the future.

3. The system of claim 1, wherein said two market factors comprise a demand factor and a concentration factor.

4. The system of claim 3, wherein said demand factor comprises a change in a quantity of a commodity shipped per year over a plurality of years.

5. The system of claim 3, wherein said concentration factor comprises a change in a Herfindahl index value for said industry per year over a plurality of years.

6. The system of claim 5, wherein said demand factor comprises a change in a quantity of a commodity shipped per year over a plurality of years.

7. A non-transitory computer readable media comprising computer-executable instructions stored therein that when executed by a computer will determine a market scenario for an industry, the computer-executable instructions comprising:

instructions to obtain at least two types of market data regarding an industry;

instructions to determine from said at least two types of market data a market scenario from four scenarios for an industry during a plurality of particular historical time periods;

instructions to combine subjective data obtained about said industry; and instructions to determine from said combined subjective data which market scenario of said four scenarios will apply to said industry during a particular time period in the future, and wherein said four scenario regions are defined by the following corresponding axes:

a rate of market share concentration paired with a first rate of market growth;

a rate of market share fragmentation paired with the first rate of market growth;

the rate of market share fragmentation paired with a second rate of market growth, wherein the second rate of market growth is less than the first rate of market growth; and the rate of market share concentration paired with the second rate of market growth.

8. The non-transitory computer readable media of claim 7, further comprising instructions to provide advice to a company within said industry based on said market scenario.

9. The non-transitory computer readable media of claim 7, wherein said at least two types of market data comprises market growth and market share.

10. A non-transitory computer readable media comprising computer-executable instructions stored therein that when executed by a computer will determine a future market scenario for an industry, the computer-executable instructions comprising:

instructions to obtain subjective data for an industry;

instructions to combine said subjective data;

instructions to determine from said combined subjective data which market scenario of a plurality of market scenarios will apply to said industry during at least one particular time period in the future, wherein said determining comprises determining a market scenario from four scenarios which are defined by the following corresponding axes:

a rate of market share concentration paired with a first rate of market growth;

a rate of market share fragmentation paired with the first rate of market growth;

the rate of market share fragmentation paired with a second rate of market growth, wherein the second rate of market growth is less than the first rate of market growth; and the rate of market share concentration paired with the second rate of market growth.

11. The non-transitory computer readable media of claim 10, wherein said obtaining subjective data comprises determining subjective answers to questions, wherein the questions are separated into two distinct classes of questions.

12. The non-transitory computer readable media of claim 11, wherein said questions in one of said two distinct classes of questions are evaluated so as to generate a first coordinate of a data point that is representative of future data for said industry.

13. The non-transitory computer readable media of claim 12, wherein said questions in another of said two distinct classes of questions are evaluated so as to generate a second coordinate of said data point that is representative of future data for said industry.

14. The non-transitory computer readable media of claim 13, wherein said first and second coordinates are determined by the following formula:

$$X(t)=1/N_{TOT}\Sigma X_n(t) =1/N_{TOT}\Sigma T_y(t), \text{wherein:}$$

$$X_n(t)=1/N_x \Sigma q_{nxi};$$

$$Y_n(t)=1/N_y \Sigma T_{nyj};$$

$q_{nxi}$=a numerical result comprising one of 1, 2, 3, 4, 5, and 6 for an ith question given to an nth interviewee, wherein the ith question has been categorized as either a B or M type question;

$q_{nyj}$=a numerical result comprising one of 1, 2, 3, 4, 5, and 6 for a jth question given to an nth interviewee, wherein the jth question has been categorized as either a W or V type question;

i=1, 2, 3, . . . $N_x$ j=1, 2, 3, . . . $N_y$ $N_x$=a total number of questions categorized as either a B or M type question;

$N_y$=a total number of questions categorized as either a W or V type question; and n=1, 2, 3, . . . $N_{TOT}$, wherein $N_{TOT}$ is a total number of interviewees.

15. The non-transitory computer readable media of claim 14, further comprising instructions to provide advice to a company within said industry based on said generated single data point.

16. A system for industry scenario mapping comprising:
a processor; and
a non-transitory memory for storing instructions, that when executed by the processor performs a method comprising:
obtaining and storing in said memory at least two types of market data regarding an industry;
combining subjective data stored in said memory that has been obtained from experts in an industry;
determining from said at least two types of market data a market scenario of a plurality of scenarios for an industry during a plurality of particular historical time periods; and
determining from said combined subjective data which market scenario of the plurality of market scenarios will apply to said industry during a plurality of particular time periods in the future,
wherein said plurality of scenarios are defined by the following corresponding axes:
a rate of market share concentration paired with a first rate of market growth;
a rate of market share fragmentation paired with the first rate of market growth;
the rate of market share fragmentation paired with a second rate of market growth, wherein the second rate of market growth is less than the first rate of market growth; and
the rate of market share concentration paired with the second rate of market growth.

17. The system of claim 16, further comprising a visual display in communication with said processor, wherein said processor prepares an advice screen to be shown on said visual display, said advice screen displaying:
a matrix representing four scenario regions and containing a graph plotting two market factors that is used to show which said market scenario said industry is plotted to for said plurality of particular historical time periods as well as said plurality of particular time periods in the future, wherein said market scenario is one of the four scenario regions.

18. The system of claim 17, wherein said two market factors comprise a demand factor and a concentration factor.

19. The system of claim 18, wherein said demand factor comprises a change in a quantity of a commodity shipped per year over a plurality of years.

20. The system of claim 18, wherein said concentration factor comprises a change in a Herfindahl index value for said industry per year over a plurality of years.

21. The system of claim 20, wherein said demand factor comprises a change in a quantity of a commodity shipped per year over a plurality of years.

* * * * *